(12) United States Patent
Kumagai

(10) Patent No.: US 8,503,729 B2
(45) Date of Patent: Aug. 6, 2013

(54) IMAGE PROCESSING APPARATUS, IMAGE PROCESSING SYSTEM, AND IMAGE PROCESSING METHOD

(75) Inventor: Akira Kumagai, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 78 days.

(21) Appl. No.: 13/316,513

(22) Filed: Dec. 11, 2011

(65) Prior Publication Data
US 2012/0219190 A1 Aug. 30, 2012

(30) Foreign Application Priority Data

Feb. 24, 2011 (JP) ................................ 2011-037830

(51) Int. Cl.
*G06K 9/00* (2006.01)
*H04N 5/232* (2006.01)

(52) U.S. Cl.
USPC ................ 382/104; 382/284; 348/118; 701/1

(58) Field of Classification Search
None
See application file for complete search history.

(56) References Cited

U.S. PATENT DOCUMENTS

| | | | | | |
|---|---|---|---|---|---|
| 5,355,118 | A | * | 10/1994 | Fukuhara | 340/435 |
| 5,386,285 | A | * | 1/1995 | Asayama | 356/4.01 |
| 5,529,138 | A | * | 6/1996 | Shaw et al. | 180/169 |
| 5,541,590 | A | * | 7/1996 | Nishio | 340/903 |
| 5,638,116 | A | * | 6/1997 | Shimoura et al. | 348/118 |
| 5,687,249 | A | * | 11/1997 | Kato | 382/104 |
| 5,739,848 | A | * | 4/1998 | Shimoura et al. | 348/119 |
| 5,949,331 | A | * | 9/1999 | Schofield et al. | 340/461 |
| 6,363,326 | B1 | * | 3/2002 | Scully | 701/301 |
| 6,538,579 | B1 | * | 3/2003 | Yoshikawa et al. | 340/928 |
| 7,149,608 | B2 | * | 12/2006 | Itoh et al. | 701/1 |
| 7,161,616 | B1 | * | 1/2007 | Okamoto et al. | 348/148 |
| 7,359,782 | B2 | * | 4/2008 | Breed | 701/45 |
| 7,493,202 | B2 | * | 2/2009 | Demro et al. | 701/45 |
| 7,502,685 | B2 | * | 3/2009 | Nakamura | 701/437 |
| 7,576,639 | B2 | * | 8/2009 | Boyles et al. | 340/435 |
| 7,602,945 | B2 | * | 10/2009 | Kubo et al. | 382/104 |
| 7,627,419 | B2 | * | 12/2009 | Yoshida | 701/117 |
| 7,630,806 | B2 | * | 12/2009 | Breed | 701/45 |
| 7,729,858 | B2 | * | 6/2010 | Koike et al. | 701/301 |
| 7,755,511 | B2 | * | 7/2010 | Yamamoto et al. | 340/932.2 |
| 7,812,931 | B2 | * | 10/2010 | Nishiuchi | 356/3.11 |

(Continued)

FOREIGN PATENT DOCUMENTS

| | | |
|---|---|---|
| JP | 2002-19556 | 1/2002 |
| JP | 2002-166802 | 6/2002 |

(Continued)

*Primary Examiner* — Manav Seth
(74) *Attorney, Agent, or Firm* — Fujitsu Patent Center

(57) ABSTRACT

An image processing apparatus: detects an object position included within an overlapping region of a first image corresponding to a vehicles's traveling direction and a second image corresponding to a direction crossing the traveling direction; assigns the first image a first value when the object is in a first position, and a second value smaller than the first value when the object is in a second position more distant from a traveling direction axis of the vehicle than the first position, and assigns the second image a third value when the object is in the first position, and a fourth value larger than the third value when the object is in the second position; and determines a boundary so that the object is included within an image having a larger value than the other; and joins the first and second images.

19 Claims, 24 Drawing Sheets

U.S. PATENT DOCUMENTS

| | | | |
|---|---|---|---|
| 8,009,977 B2 * | 8/2011 | Matsuoka et al. | 396/155 |
| 8,242,895 B2 * | 8/2012 | Shen et al. | 340/425.5 |
| 8,300,764 B2 * | 10/2012 | Yamaguchi | 378/62 |
| 8,319,618 B2 * | 11/2012 | Gomi et al. | 340/435 |
| 2002/0094110 A1 * | 7/2002 | Okada et al. | 382/104 |
| 2005/0231340 A1 * | 10/2005 | Tauchi | 340/435 |
| 2007/0053551 A1 * | 3/2007 | Kubo et al. | 382/106 |
| 2009/0297041 A1 * | 12/2009 | Nagamine et al. | 382/209 |
| 2010/0067773 A1 * | 3/2010 | Yamaguchi | 382/132 |

FOREIGN PATENT DOCUMENTS

| | | |
|---|---|---|
| JP | 2007-36668 | 2/2007 |
| JP | 2007-41791 | 2/2007 |
| JP | 2009-137353 | 6/2009 |
| JP | 2010-15436 | 1/2010 |

* cited by examiner

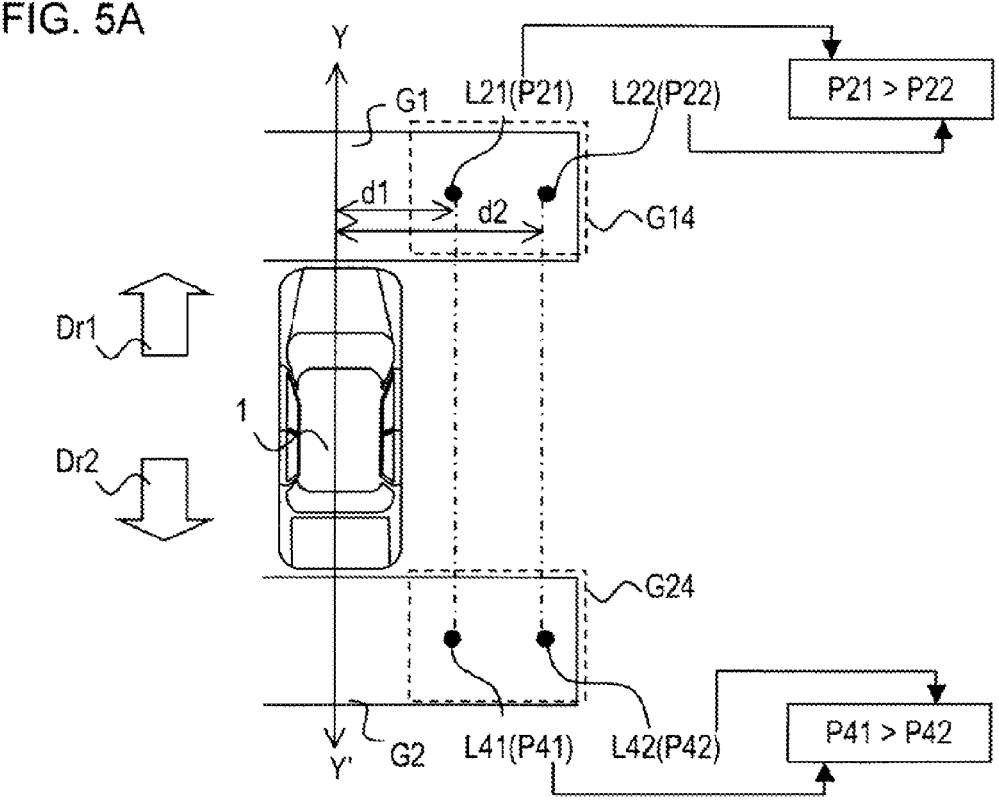
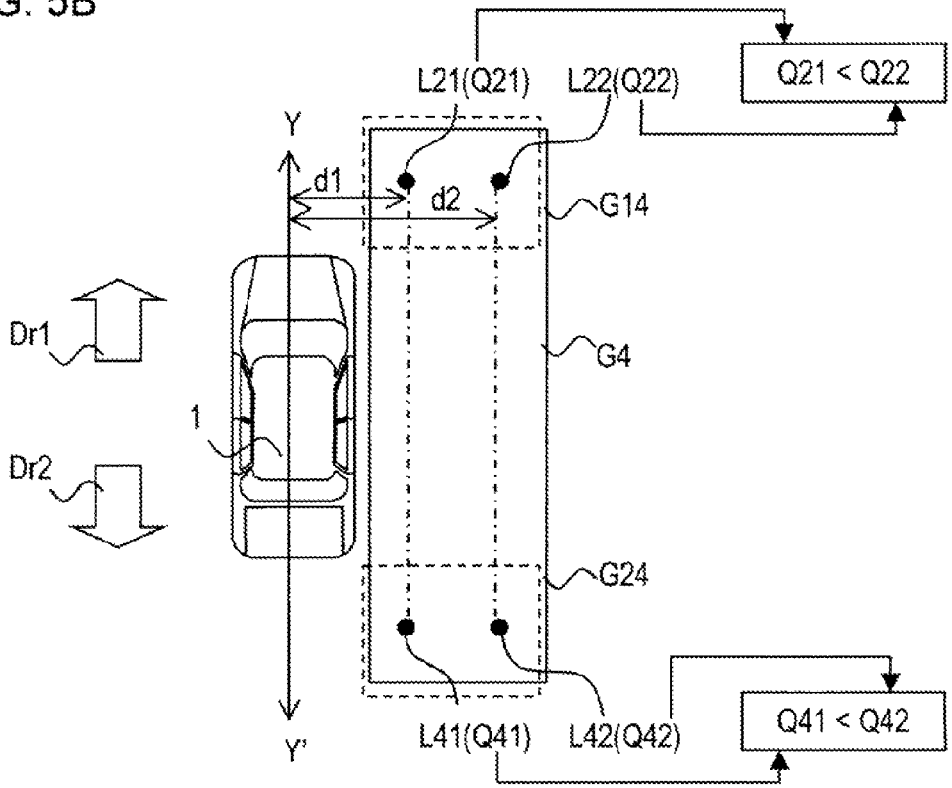

FIG. 20A

| SCORE MAP | OBJECT POSITION | |
|---|---|---|
| | CLOSE | DISTANT |
| FORWARD-DIRECTION SCORE MAP | P101 > | P201 |
| | ∧ | ∧ |
| REVERSE-DIRECTION SCORE MAP | P102 > | P202 |
| INWARD-DIRECTION SCORE MAP | P103 > | P203 |
| | ∨ | ∨ |
| OUTWARD-DIRECTION SCORE MAP | P104 > | P204 |

FIG. 20B

| SCORE MAP | OBJECT POSITION | |
|---|---|---|
| | CLOSE | DISTANT |
| FORWARD-DIRECTION SCORE MAP | Q101 < | Q201 |
| | ∧ | ∧ |
| REVERSE-DIRECTION SCORE MAP | Q102 < | Q202 |
| INWARD-DIRECTION SCORE MAP | Q103 < | Q203 |
| | ∨ | ∨ |
| OUTWARD-DIRECTION SCORE MAP | Q104 < | Q204 |

FIG. 20C

| SCORE MAP | OBJECT POSITION | |
|---|---|---|
| | CLOSE | DISTANT |
| FORWARD-DIRECTION SCORE MAP | P301 > | P401 |
| | ∧ | ∧ |
| REVERSE-DIRECTION SCORE MAP | P302 > | P402 |
| INWARD-DIRECTION SCORE MAP | P303 > | P403 |
| | ∨ | ∨ |
| OUTWARD-DIRECTION SCORE MAP | P304 > | P404 |

FIG. 20D

| SCORE MAP | OBJECT POSITION | |
|---|---|---|
| | CLOSE | DISTANT |
| FORWARD-DIRECTION SCORE MAP | Q301 < | Q401 |
| | ∧ | ∧ |
| REVERSE-DIRECTION SCORE MAP | Q302 < | Q402 |
| INWARD-DIRECTION SCORE MAP | Q303 < | Q403 |
| | ∨ | ∨ |
| OUTWARD-DIRECTION SCORE MAP | Q304 < | Q404 |

FIG. 20E

| SCORE MAP | OBJECT POSITION | |
|---|---|---|
| | CLOSE | DISTANT |
| FORWARD-DIRECTION SCORE MAP | Q305 < | Q405 |
| | ∧ | ∧ |
| REVERSE-DIRECTION SCORE MAP | Q306 < | Q406 |
| INWARD-DIRECTION SCORE MAP | Q307 < | Q407 |
| | ∧ | ∧ |
| OUTWARD-DIRECTION SCORE MAP | Q308 < | Q408 |

|  | POSITION | DISPLACEMENT DIRECTION | SIZE | DISPLACEMENT SPEED |
|---|---|---|---|---|
| Ob1(BALL) | L10 | OPPOSITE DIRECTION | SMALL | FAST |
| Ob2(CHILD) | L20 | INWARD-DIRECTION | MEDIUM | SLOW |
| Ob3(ADULT) | L30 | OUTWARD-DIRECTION | MEDIUM | SLOW |

| | X0 | X1 | X2 | X3 | X4 | X5 | X6 | X7 |
|---|---|---|---|---|---|---|---|---|
| Y0 | 5 | 5 | 5 | 5 | 5 | 4 | 4 | 4 |
| Y1 | 5 | 5 | 5 | 5 | 4 | 4 | 4 | 3 |
| Y2 | 5 | 5 | 5 | 5 | 4 | 4 | 3 | 3 |
| Y3 | 5 | 5 | 5 | 4 | 4 | 4 | 2 | 2 |
| Y4 | 5 | 5 | (5) | 4 | 4 | 3 | 2 | 2 |
| Y5 | 5 | 5 | 5 | 4 | 3 | 3 | 2 | 2 |
| Y6 | 5 | 5 | 4 | 3 | 3 | 3 | 2 | 1 |
| Y7 | 5 | 5 | 4 | 3 | 3 | 3 | 1 | 1 |

PM12

| | X0 | X1 | X2 | X3 | X4 | X5 | X6 | X7 |
|---|---|---|---|---|---|---|---|---|
| Y0 | 2 | 2 | 2 | 2 | 2 | 2 | 3 | 3 |
| Y1 | 2 | 2 | 2 | 2 | 2 | 3 | 3 | 3 |
| Y2 | 2 | 2 | 2 | 2 | 2 | 3 | 3 | 3 |
| Y3 | 2 | 2 | 2 | 2 | 3 | 3 | 3 | 3 |
| Y4 | 2 | 2 | (2) | 3 | 3 | 3 | 3 | 3 |
| Y5 | 2 | 2 | 3 | 3 | 3 | 3 | 3 | 3 |
| Y6 | 2 | 3 | 3 | 3 | 3 | 3 | 3 | 3 |
| Y7 | 3 | 3 | 3 | 3 | 3 | 3 | 3 | 3 |

| | X0 | X1 | X2 | X3 | X4 | X5 | X6 | X7 |
|---|---|---|---|---|---|---|---|---|
| Y0 | 5 | 5 | 5 | 5 | 5 | 4 | 4 | 4 |
| Y1 | 5 | 5 | 5 | 5 | 4 | 4 | 4 | 3 |
| Y2 | 5 | 5 | 5 | 5 | 4 | 4 | 3 | 3 |
| Y3 | 5 | 5 | (5) | 4 | 4 | 4 | 2 | 2 |
| Y4 | 5 | 5 | 5 | 4 | 4 | 3 | 2 | 2 |
| Y5 | 5 | 5 | 5 | 4 | 3 | 3 | 2 | 2 |
| Y6 | 5 | 5 | 4 | 3 | 3 | 3 | 2 | 1 |
| Y7 | 5 | 5 | 4 | 3 | 3 | 3 | 1 | 1 |

PM16

| | X0 | X1 | X2 | X3 | X4 | X5 | X6 | X7 |
|---|---|---|---|---|---|---|---|---|
| Y0 | 1 | 1 | 1 | 1 | 1 | 1 | 1 | 1 |
| Y1 | 1 | 1 | 1 | 1 | 1 | 1 | 1 | 2 |
| Y2 | 1 | 1 | 1 | 1 | 1 | 1 | 2 | 2 |
| Y3 | 1 | 1 | (1) | 1 | 1 | 2 | 2 | 2 |
| Y4 | 1 | 1 | 1 | 1 | 2 | 2 | 2 | 2 |
| Y5 | 1 | 1 | 1 | 2 | 2 | 2 | 2 | 2 |
| Y6 | 1 | 1 | 2 | 2 | 2 | 2 | 2 | 2 |
| Y7 | 1 | 2 | 2 | 2 | 2 | 2 | 2 | 2 |

| | X0 | X1 | X2 | X3 | X4 | X5 | X6 | X7 |
|---|---|---|---|---|---|---|---|---|
| Y0 | 3 | 3 | 3 | 3 | 2 | 2 | 1 | 1 |
| Y1 | 3 | 3 | 3 | 3 | 2 | 2 | 1 | 1 |
| Y2 | 3 | 3 | 3 | 3 | 2 | 2 | 1 | 1 |
| Y3 | 3 | 3 | 3 | 3 | (2) | 2 | 1 | 1 |
| Y4 | 3 | 3 | 3 | 3 | 2 | 2 | 1 | 1 |
| Y5 | 3 | 3 | 3 | 3 | 2 | 2 | 1 | 1 |
| Y6 | 3 | 3 | 3 | 3 | 2 | 2 | 1 | 1 |
| Y7 | 3 | 3 | 3 | 3 | 2 | 2 | 1 | 1 |

PM20

| | X0 | X1 | X2 | X3 | X4 | X5 | X6 | X7 |
|---|---|---|---|---|---|---|---|---|
| Y0 | 1 | 1 | 1 | 1 | 2 | 2 | 2 | 2 |
| Y1 | 1 | 1 | 1 | 1 | 2 | 2 | 2 | 2 |
| Y2 | 1 | 1 | 1 | 1 | 2 | 2 | 2 | 2 |
| Y3 | 1 | 1 | 1 | 1 | (2) | 2 | 2 | 2 |
| Y4 | 1 | 1 | 1 | 1 | 2 | 2 | 2 | 2 |
| Y5 | 1 | 1 | 1 | 1 | 2 | 2 | 2 | 2 |
| Y6 | 1 | 1 | 1 | 1 | 2 | 2 | 2 | 2 |
| Y7 | 1 | 1 | 1 | 1 | 2 | 2 | 2 | 2 |

FIG. 24A

|  | POSITION | SIZE | DISPLACE-MENT SPEED |
|---|---|---|---|
| Ob1(BALL) | 5 | 1 | 3 |
| Ob2(CHILD) | 5 | 2 | 1 |
| Ob3(ADULT) | 2 | 2 | 1 |

FIG. 24B

|  | POSITION | SIZE | DISPLACE-MENT SPEED |
|---|---|---|---|
| Ob1(BALL) | 2 | 1 | 3 |
| Ob2(CHILD) | 1 | 2 | 1 |
| Ob3(ADULT) | 2 | 2 | 1 |

FIG. 24C

|  | POSITION | | SIZE | | DISPLACE-MENT SPEED | | |
|---|---|---|---|---|---|---|---|
| Ob1(BALL) | 5 | ×3 × | 1 | ×1 × | 3 | ×2 = | 90 |
| Ob2(CHILD) | 5 | ×3 × | 2 | ×1 × | 1 | ×2 = | 60 |
| Ob3(ADULT) | 2 | ×3 × | 2 | ×1 × | 1 | ×2 = | 24 |
| | | | | | | SUMMED TOTAL | 174 |

FIG. 24D

|  | POSITION | | SIZE | | DISPLACE-MENT SPEED | | |
|---|---|---|---|---|---|---|---|
| Ob1(BALL) | 2 | ×3 × | 1 | ×1 × | 3 | ×2 = | 36 |
| Ob2(CHILD) | 1 | ×3 × | 2 | ×1 × | 1 | ×2 = | 12 |
| Ob3(ADULT) | 2 | ×3 × | 2 | ×1 × | 1 | ×2 = | 24 |
| | | | | | | SUMMED TOTAL | 72 |

IMAGE PROCESSING APPARATUS, IMAGE PROCESSING SYSTEM, AND IMAGE PROCESSING METHOD

CROSS-REFERENCE TO RELATED APPLICATION

This application is based upon and claims the benefit of priority of the prior Japanese Patent Application No. 2011-037830, filed on Feb. 24, 2011, the entire contents of which are incorporated herein by reference.

FIELD

Embodiments discussed herein relate to an image processing apparatus, an image processing system, and an image processing method.

BACKGROUND

An image processing apparatus is known, which joins images of area around a vehicle in a plurality of direction to generate and display an overhead-view image, in which a region around the vehicle was viewed from, for example, above (for example, Japanese patent laid-open publications 2009-137353, 2007-41791, and 2007-36668). Such an overhead-view image is, for example, displayed on a display screen of a navigation system and is used by a driver for ensuring safety. Hence, the overhead-view image is required to include all objects in the region around the vehicle and to have a fine visibility.

To meet the above requirement, a plurality of imaging devices are equipped, for example, at front, rear, left, and right sections of the vehicle to take images in four directions, that is, front, rear, left, and right of the vehicle, of which equipping positions and angles of a pair of the imaging devices next to each other are adjusted so that imaging regions thereof overlap with each other to some extent. Thereby, all objects in the region around the vehicle are imaged without being missed.

In this case, the generated images have overlapping regions. Hence, such an image process is performed as to set a boundary between the two images at the overlapping regions, and the two images are joined along the boundary. However, imaging devices have production errors, therefore, it is difficult to match the optical properties of the adjacent imaging devices. Hence, the images have discontinuity around the boundaries. Hence, there is proposed a method for making the discontinuity of the image less outstanding to avoid deterioration of the visibility. For example, there is an imaging method such as to make the images translucent and overlap with each other around the boundaries.

However, if images of a single object from different angles overlap with each other, the object could be displayed double. Then, for example, when there is an object which is subject to a collision-avoidance operation around the boundaries, the object being displayed double possibly causes confusion for the driver. Such confusion is not preferable for the safety.

SUMMARY

An image processing apparatus in one embodiment includes: a detecting unit which detects a position of an object included within an overlapping region of a first image corresponding to a traveling direction of a vehicle or an opposite direction to the traveling direction and a second image corresponding to a direction crossing the traveling direction of the vehicle; a processing unit which assigns the first image a first evaluation value when the object is in a first position, and a second evaluation value, which is smaller than the first evaluation value, when the object is in a second position of which a distance from a traveling direction axis of the vehicle is larger than the same of the first position, and assigns the second image a third evaluation value when the object is in the first position, and a fourth evaluation value, which is larger than the third evaluation value, when the object is in the second position; a determining unit which determines a boundary of the first and second images for joining the first and second images, so that the object is included within either of the first and second images, which has a larger evaluation value than the other; and a generating unit which joins the first and second images along the boundary and generates an image, in which a region around the vehicle is viewed from a prescribed viewpoint.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B illustrate the score-assignment processes at the times of the vehicle traveling in the front and rear directions;

FIGS. 20A-20E illustrate score maps;

FIGS. 23A-23C illustrate examples of the score maps; and

FIGS. 24A-24D illustrate scores to be assigned.

DESCRIPTION OF EMBODIMENTS

Preferred embodiments will be explained with reference to accompanying drawings.

Figure 1:
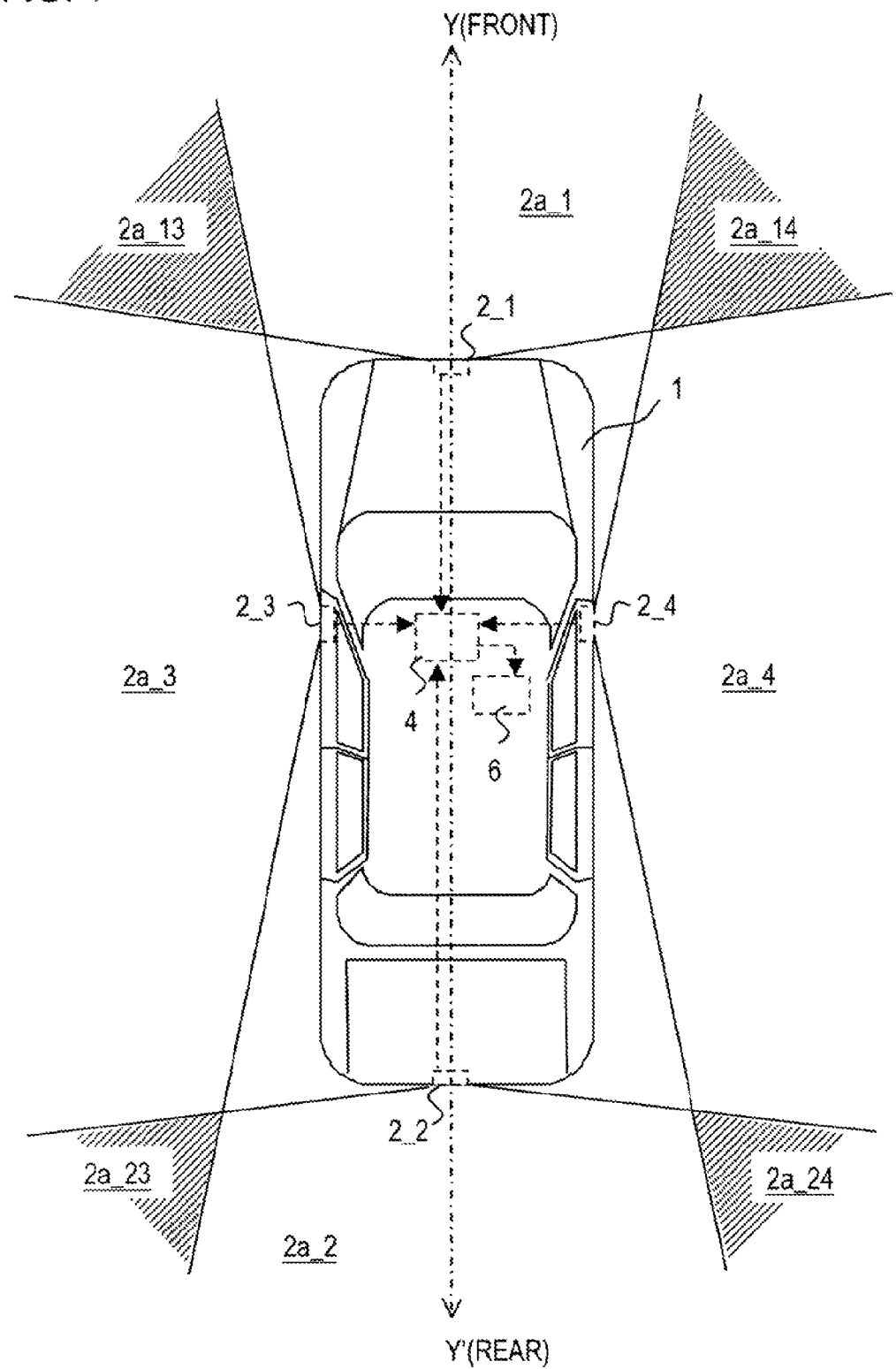
FIG. 1 illustrates a configuration example of an image processing system to which an image processing apparatus of one embodiment is applied.

FIG. 1 illustrates a configuration example of an image processing system, to which an image processing apparatus of the present embodiment is applied. This image processing system generates from a plurality of images and displays an image of a region around a vehicle 1 viewed from a prescribed viewpoint. The image of the region around the vehicle 1 viewed from the prescribed viewpoint is, for example, an overhead-view image of the region around the vehicle 1 viewed from a virtual viewpoint above the vehicle 1.

This image processing system is equipped on the vehicle 1, which has a traveling directions towards the front and the rear. Hereafter, when the vehicle 1 travels towards the front, the front direction is referred to as the traveling direction, and the rear direction is referred to as the opposite direction to the traveling direction. On the contrary, when the vehicle 1 travels towards the rear, the rear direction is referred to as the traveling direction, and the front direction is referred to as the opposite direction to the traveling direction. In either case, the front-rear axis passing through the center of the body of the vehicle 1 is referred to as the traveling direction axis Y-Y'.

The image processing system includes, for example, imaging devices 2_1, 2_2, 2_3, and 2_4, an image processing apparatus 4, and a displaying apparatus 6. The imaging devices 2_1, 2_2, 2_3, and 2_4 are respectively equipped, for example, at front, rear, left, and right sections of the vehicle 1. For example, the imaging device 2_1 is equipped at around a number plate or a front grill at the front section of the vehicle 1. Also, the imaging device 2_2 is equipped around a number plate or a bumper at the rear section of the vehicle 1. Also, the imaging devices 2_3, 2_4 are equipped around side-mirrors at the left and right sections of the vehicle 1. The imaging devices 2_1, 2_2, 2_3, and 2_4 respectively image imaging regions 2a_1, 2a_2, 2a_3, and 2a_4 in the front, rear, left, and right directions of the vehicle. Here, optical characteristics, equipping positions, and equipping angles of the imaging devices 2_1-2_4 are adjusted, so that the imaging region 2a_1 and the imaging regions 2a_3, 2a_4 respectively have overlapping regions 2a_13, 2a_14, illustrated by hatching, and the imaging region 2a_2 and the imaging regions 2a_3, 2a_4 respectively have overlapping regions 2a_23, 2a_24 illustrated by hatching. Thereby, every object in the imaging regions 2a_1-2a_4 is imaged without being missed.

The image processing apparatus 4 takes in and performs an image process to image data imaged by the imaging devices 2_1-2_4, and joins the images, thus generating an overhead-view image data. The image processing apparatus 4 is equipped, for example, within an image processing ECU (Electronic Control Unit) or a navigation system. The overhead-view image data is sent to the displaying apparatus 6. The displaying apparatus 6 displays an overhead-view image according to the overhead-view image data. The displaying apparatus 6 includes, for example, a display unit of the navigation system.

Figure 2A:
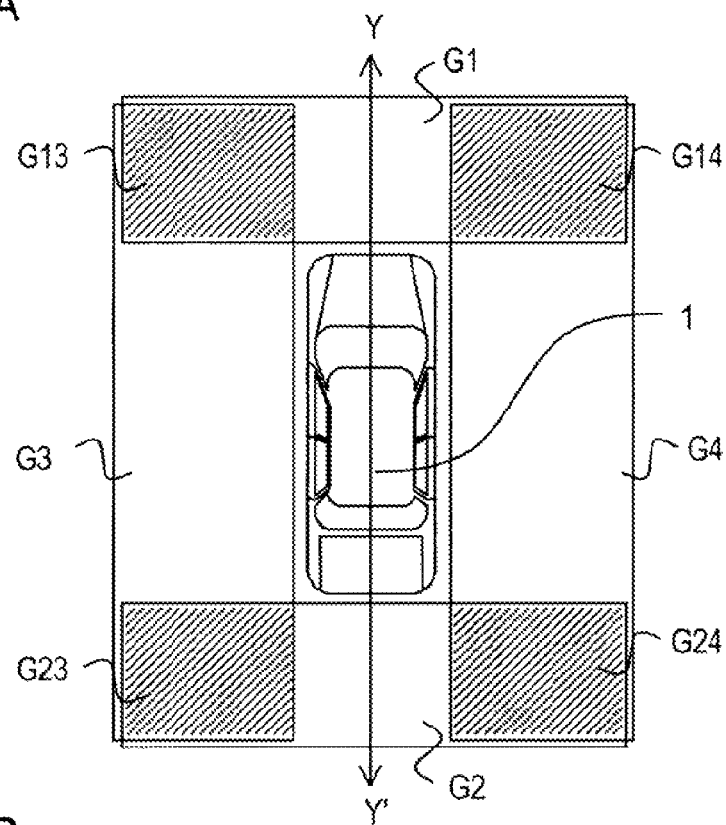
FIGS. 2A and 2B illustrate images of the area around a vehicle and an overhead-view image.
Figure 2B:
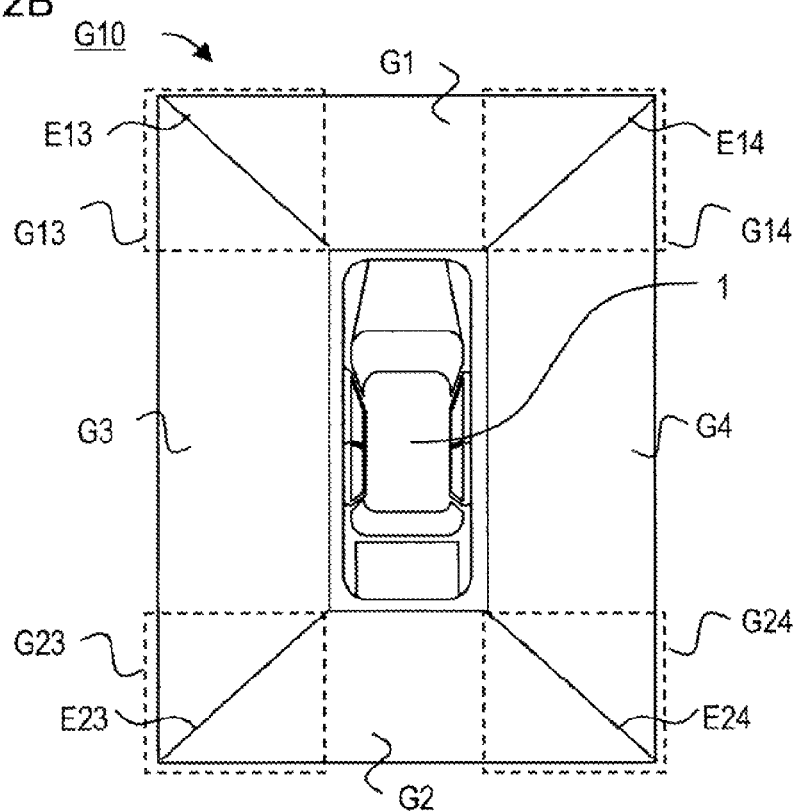

FIGS. 2A and 2B are drawings for illustrating images of the area around the vehicle and the overhead-view image. In FIG. 2A, images G1, G2, G3, and G4 imaged by the imaging devices 2_1, 2_2, 2_3, and 2_4 are schematically illustrated. For example, there are illustrated, corresponding to the traveling direction axis Y-Y' of the vehicle 1, the image G1 of the front region and the image G2 of the rear region. Here, when the vehicle 1 travels towards the front, an image corresponding to the traveling direction (the front direction) is the image G1, and an image corresponding to the opposite direction to the traveling direction (the rear direction) is the image G2. On contrary, when the vehicle 1 travels towards the rear, an image corresponding to the traveling direction (the rear direction) is the image G2, and an image corresponding to the opposite direction to the traveling direction (the front direction) is the image G1. Also, there are illustrated the image G3 of the left region and the image G4 of the right direction, corresponding to a direction crossing the traveling direction axis Y-Y'. According to the setting of the imaging regions 2a_1-2a_4, as illustrated in FIG. 1, the image G1 and the images G3, G4 respectively have the overlapping regions G13, G14 as illustrated by hatching, and the image G2 and the images G3, G4 respectively have the overlapping regions G23, G24 as illustrated by hatching.

In FIG. 2B, an overhead-view image G10 around the vehicle 1, obtained by joining the images G1-G4, is schematically illustrated. The image processing apparatus 4 joins the image G1 and the images G3, G4 respectively along boundaries E13, E14 in the overlapping regions G13, G14. Also, the image processing apparatus 4 joins the image G2 and the images G3, G4 respectively along boundaries E23, E24 in the overlapping regions G23, G24. Such the boundaries E13, E14, E23, and E24 are determined by a method explained below.

Figure 3:
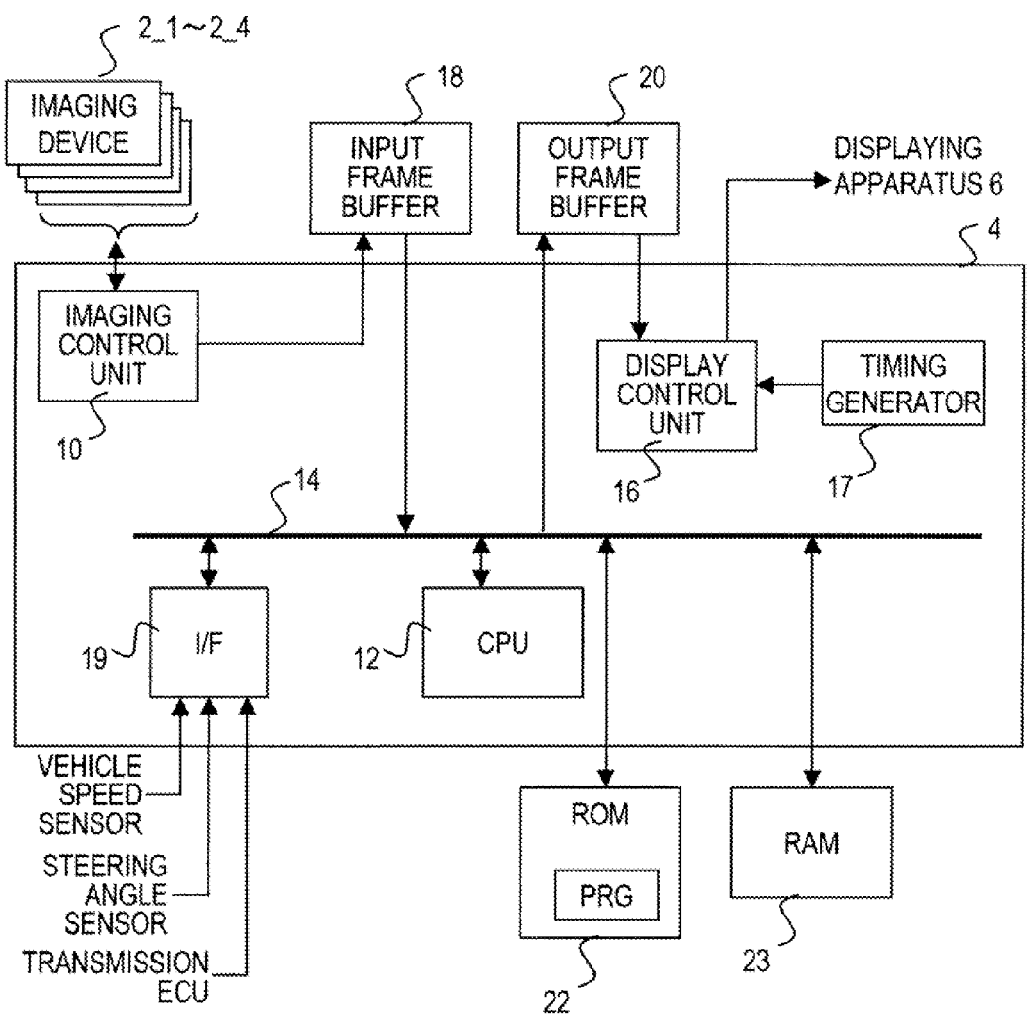
FIG. 3 illustrates a configuration example of the image processing apparatus.

FIG. 3 illustrates a configuration example of the image processing apparatus 4. The image processing apparatus 4 includes, for example, an image processing LSI (Large Scale Integration), which has an imaging control unit 10, a CPU (Central Processing Unit) 12, a bus 14, a display control unit 16, a timing generator 17, and an interface unit 19. To the bus 14, an input frame buffer 18, an output frame buffer 20, a ROM (Read Only Memory) 22, and a RAM (Random Access Memory) 23 are connected.

The imaging control unit 10 outputs to the imaging devices 2_1-2_4 various control signals and timing signals for controlling imaging operations of the imaging devices 2_1-2_4. Also, the imaging control unit 10 is input with image data from the imaging devices 2_1-2_4. The imaging control unit 10 stores the image data in the input frame buffer 18. The input frame buffer 18 and the output frame buffer 20 include, for example, video RAMs.

The CPU 12 reads out from the ROM 22 into the RAM 23 an image processing program PRG, and operates according to the image processing program PRG. The CPU 12 reads out from the input frame buffer 18 the image data, and performs thereto an image process described below so as to join the images, thus generating the overhead-view image data. The overhead-view image data is stored in the output frame buffer 20.

The overhead-view image data stored in the output frame buffer 20 is read out by the display control unit 16. The display control unit 16, in sync with the timing signal generated by the timing generator 17, outputs the overhead-view image data to the displaying apparatus 6, and makes the displaying apparatus 6 display the overhead-view image.

The interface unit 19 is input with a vehicle-speed signal from a vehicle-speed sensor of the vehicle 1, a steering-angle signal from a steering-angle sensor, and a signal for indicating the traveling direction of the vehicle (for example, a transmission signal) from a transmission ECU. These signals are sent to the CPU 12 and used as parameters in generating an overhead-view image.

Figure 4:
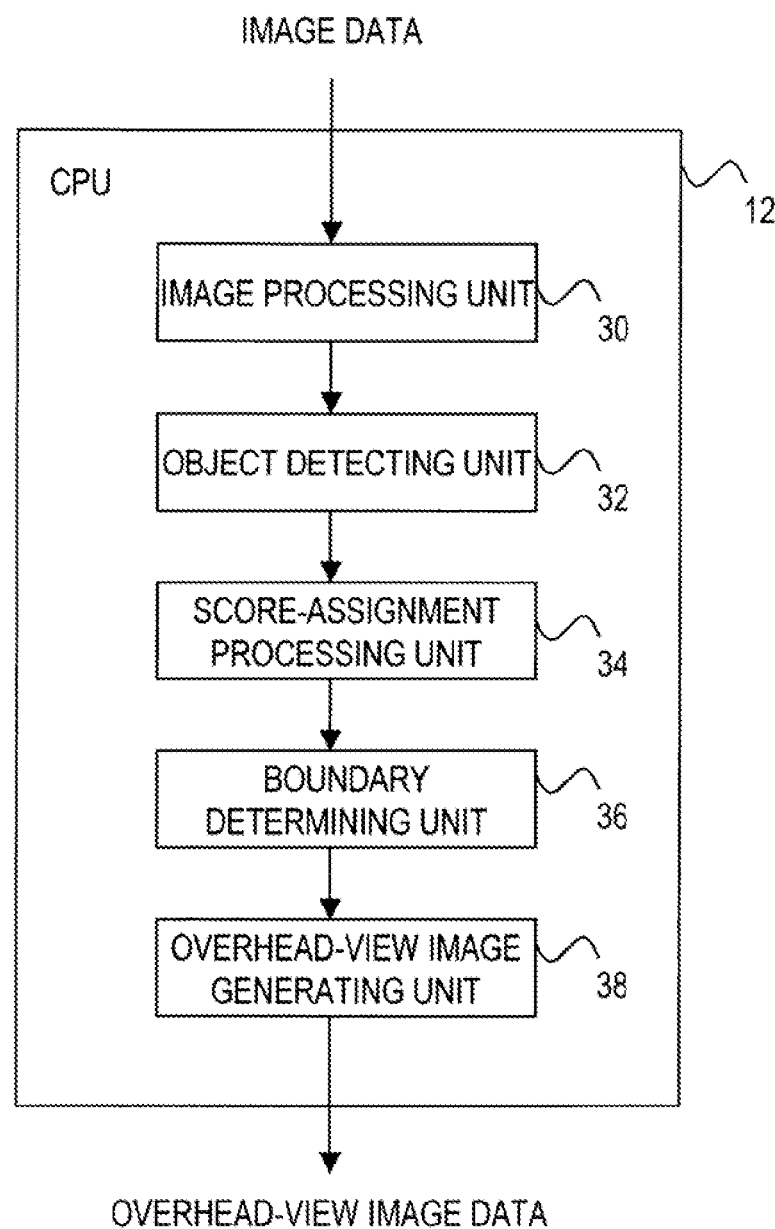
FIG. 4 is a functional block diagram of a CPU.

FIG. 4 is a functional block diagram of the CPU 12, which operates according to the image-processing program PRG. The CPU 12 has an image processing unit 30, which performs prescribed image process for generating the overhead-view image to each image data, an object detecting unit 32, a score-assignment processing unit 34, a boundary determining unit 36, and an overhead-view image generating unit 38.

The image process by the image processing unit 30 includes, for example, a coordinates conversion process for converting the image viewed from imaging positions into an image views from a virtual view point above the vehicle 1, and various correction processes for correcting the contour or color of the images.

The object detecting unit 32 performs to the images G1-G4, for example, an edge detection according to gradation difference between adjacent pixels, and detects objects by a pattern matching of the detected edges with shapes previously stored in the ROM 22. The objects are, for example, pedestrians, other vehicles, and road-side installations such as a guardrail and a pole. Also, the object detecting unit 32 detects the position, size, displacement direction, displacement speed, or the like of the object. The position of the object is, for example, a coordinates on X-Y plane with a prescribed portion of the vehicle 1 as the origin on the horizontal plane. The size of the object is detected, for example, according to the type of the object detected by the pattern matching. Also, the displacement direction of the object is detected, for example, on the basis of time-dependent change of the position of the object. The object detecting unit 32, for example, stores the detected object position in the RAM 23 in every imaging cycle or image processing cycle of tens of milliseconds, and calculates the difference of the position from cycle to cycle. Here, the displacement speed of the object is the displacement amount of the object in a unit time, for example, the imaging cycle or the image processing cycle. The object detecting unit 32 detects, for example, the traveling speed of the vehicle 1 according to the vehicle speed signal input via the interface unit 19, and, thereby, corrects the displacement speed of the object.

Also, the object-detecting unit 32 detects the position of the object included within the overlapping regions G13, G14, G23, or G24 of the first image corresponding to the traveling direction of the vehicle 1 the opposite direction to the traveling direction (that is, the image G1 of the front region, of the image G2 of the rear region) and the second image corresponding to a direction crossing the traveling direction axis Y-Y' of the vehicle 1 (that is, the image G3 of the left region, or the image G4 of the right region). The object detecting unit 34 detects the traveling direction of the vehicle 1 (the front or rear direction), according to, for example, the transmission signal input via the interface unit 19. Or, the object detecting unit 32 detects the turn direction of the vehicle 1 (the left or right direction), according to, for example, the steering-angle signal input via the interface unit 19.

The score-assignment processing unit 34 assigns the images G1, G2 the first evaluation value (score) when the object is in the first position, and the second score, which is larger than the first score, when the object is in the second position, of which a distance from the traveling direction axis Y-Y' of the vehicle 1 is larger than that of the first position, and assigns the images G3, G4 the third score, when the object is in the first position, and the fourth score, which is larger than the third score, when the object is in the second position. Or, as described below, the score-assignment processing unit 34 performs the score-assignment process according to the turn direction of the vehicle 1, the displacement direction of the object, the displacement amount per unit time, or the size of the object.

The boundary determining unit 36 determines the boundaries (the boundaries E13, E14, E23, and E24), along which the images are joined, so that the object is included within either the images G1, G2 or the images G3, G4, whichever has a larger score. Hereafter, the image having a larger score is referred to as a priority image.

The overhead-view image generating unit 38 joins the images G1, G2 and G3, G4 along the boundaries E13, E14, E23, E24, and generates an image of a region around the vehicle 1 viewed from a prescribed view point, for example, an overhead-view image G10 viewed from a view point above the vehicle 1. Then, the overhead-view image data is output.

Next, the score-assignment process by the score-assignment processing unit 34 will be explained in detail. Here, the score-assignment process will be explained in cases, such as:

[1] the score-assignment process according to the traveling direction of the vehicle 1 and an object position, and

[2] the score-assignment process according to the traveling direction of the vehicle 1 and the displacement direction of an object.

[1] The Score-Assignment Process According to the Traveling Direction of the Vehicle 1 and an Object Position FIGS. 5A and 5B are drawings for illustrating the score-assignment processes at the times of the vehicle 1 traveling in the front direction and in the rear direction. In FIGS. 5A, 5B, there are illustrated examples, in which the vehicle 1 travels in the front direction (the traveling direction Dr1) and in the rear direction (the traveling direction Dr2). In FIG. 5A, examples are illustrated, in which object positions L21, L22 are detected within the image G1 of the front region and further within the overlapping region G14 thereof overlapping with the image G4 of the right region. Also, examples are illustrated, in which object positions L41, L42 are detected within the image G2 in the rear region and further within the overlapping region G24 thereof overlapping with the image G4 in the right region. Here, the object positions L21, L41 both have a distance d1 form the traveling direction axis Y-Y', and the positions L22, L42 both have a distance d2(>d1) from the traveling direction axis Y-Y'. Incidentally, since the explanation for the image G4 of the right region is applicable to the image G3 of the left region by reversing "right" and "left", hereafter, explanations for the image G3 of the left region, and the overlapping regions G13, G23 thereof overlapping with the image G1 of the front region and the image G2 of the rear region will be omitted.

The score-assignment processing unit 34 assigns score to the images G1, G2, so that, the scores assigned to the image G1, G2 at the time when the object position is close to the traveling direction axis Y-Y' are larger than the scores assigned to the images G1, G2 at the time when the object position is distant from the traveling direction axis Y-Y'. For example, the score-assignment processing unit 34 assigns the image G1 of the front region, as in parenthesis, the score P21 in the case of the position L21 and the score P22(<P21) in the case of the position L22. Also, the score-assignment processing unit 34 assigns the image G2 of the rear region the score P41 in the case of the position L41 and the score P42(<P41) in the case of the position L42.

Next, in FIG. 5B, there are illustrated examples in which, within the image G4 of the right region, the object positions L21, L22, L41, and L42, as illustrated in FIG. 5A, are detected. The positions L21, L41 and the positions L22, L42 respectively have the same distances d1, d2 from the traveling direction axis Y-Y' as in FIG. 5A. The score-assignment processing unit 34 assigns the image G4 score, so that the score assigned to the image G4 at the time when the object position is distant from the traveling direction axis Y-Y' are larger than the score assigned to the image G4 at the time when the object position is close to the traveling direction axis Y-Y'. For example, the score-assignment processing unit 34 assigns the image G4 the score Q21 in the case of the position L21 and the score Q22(>Q21) in the case of the position L22. Also, the score-assignment processing unit 34 assigns the image G4 the score Q41 in case of the position L41 and the score Q42 (>Q41) in the case of the position L42.

Figure 6A:
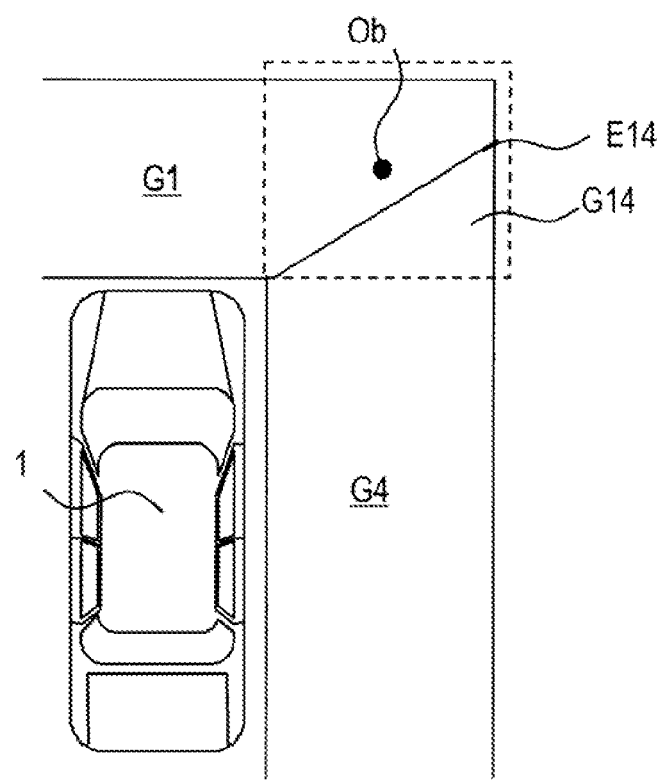
FIGS. 6A and 6B illustrate processes performed by a boundary-determining unit.
Figure 6B:
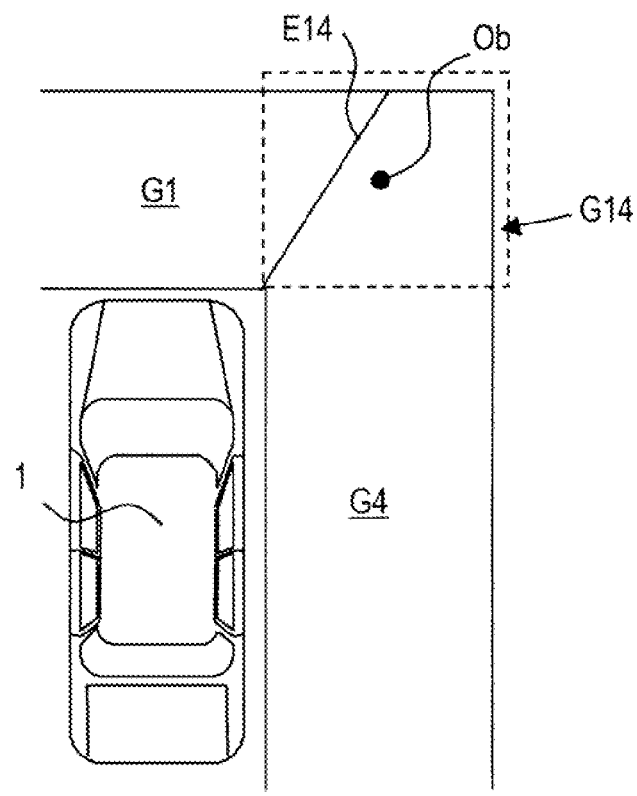

FIGS. 6A and 6B are drawings for illustrating processes performed by the boundary-determining unit 36. In FIGS. 6A, 6B, there are illustrated examples, in which the boundary E14 is determined in joining the image G1 of the front region and the image G4 of the right region. The boundary determining unit 36 determines the boundary E14 in joining the image G1 of the front region and the image G4 of the right region, so that the object is included within the image having a larger score assigned by the score-assignment processing unit 34, that is, a priority image. For example, in FIG. 6A, scores are assigned to the image G1 of the front region and the image G4 of the right region according to the position of the object Ob included within the overlapping region G14. Then, if the score assigned to the image G1 is larger than the score assigned to the image G4, that is, the image G1 is the priority image, the boundary E14 is determined so that the object Ob is included within the image G1. On the other hand, as illustrated in FIG. 6B, if the score assigned to the image G4 is larger than the score assigned to the image G1, that is, the image G4 is the priority image, the boundary E14 is determined so that the object Ob is included within the image G4.

Similarly to the above, the boundaries E13, E23, and E24 are determined. Then, by the overhead-view image generating unit 38, the images G1, G4 are joined along the determined boundary E14 as described above. Also, along the boundary E24, the images G2, G4 are joined. Also, along the boundary E13, the images G1, G3 are joined. Then, along the boundary E23, the image G2, G3 are joined. As such, the overhead-view image G10 as illustrated in FIG. 2B is generated. Incidentally, at the boundaries E13, E14, E23, and E24, the adjacent images may overlap with each other to some extent. Also, shapes or positions of the boundaries E13, E14, E23, and E24 are not limited to the examples illustrated in FIGS. 6A, 6B, and may differ from one another.

By the above processes, even when a relative position of an object to the vehicle 1 time-dependently changes, for example, along with progress of the imaging cycle and the image processing cycle, an image, which is more likely to include the object, is set as the priority image. For example, in the case of the overlapping region G14, by assigning the score according to the distance from the traveling direction axis Y-Y' of the vehicle 1, the image G1 is determined as the priority image when the object position within the overlapping region G14 is closer to the front of the vehicle 1, or the image G4 is determined as the priority image otherwise. In other words, by making the object included within the priority image, the object is continuously included within the same image, and setting the boundary near the object is avoided. Further, for example, in the case of the overlapping region G14, by setting the boundary E14 apart from the object Ob by a prescribed distance, setting the boundary near the object is avoided with higher certainty. In this case, the distance from the object Ob is arbitrarily determined by a simulation or the like. Or, the boundary E41 may be determined so that the entire overlapping region G14 is included within the image G1 or G4, whichever is determined as the priority image. Thereby, even when discontinuity of the image around the boundary is likely to occur, the influence thereof is suppressed and the deterioration of visibility of the overhead-view image is avoided.

Figure 7A:
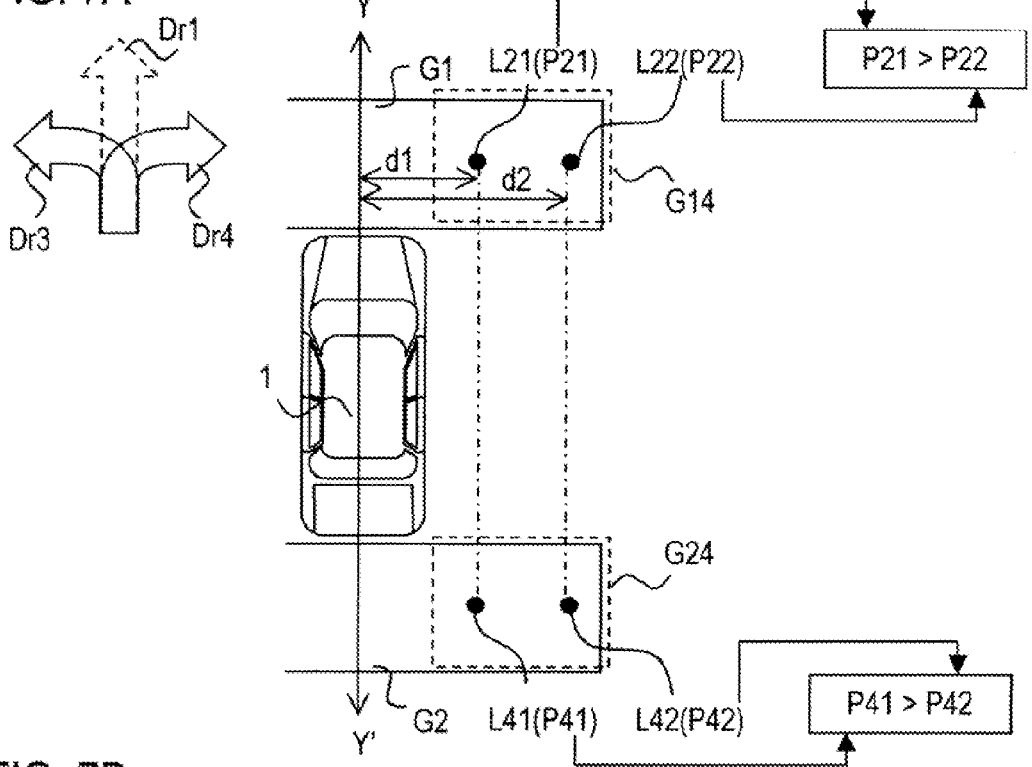
FIGS. 7A and 7B illustrate a score-assignment processes when the vehicle makes a turn.
Figure 7B:
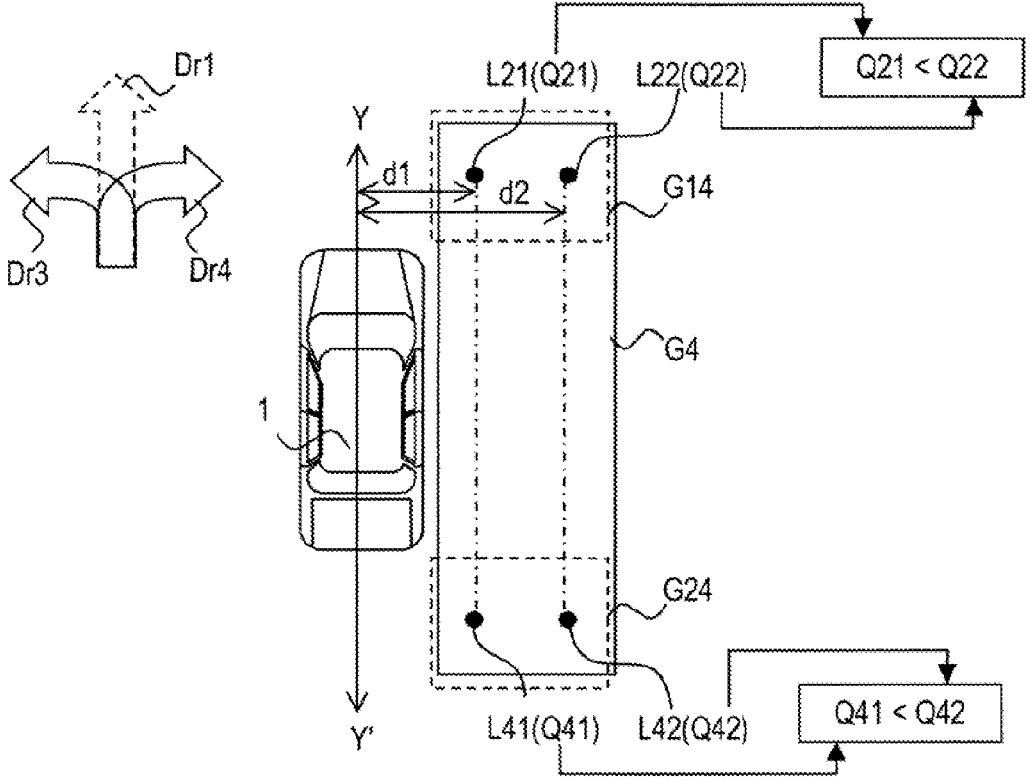

FIGS. 7A and 7B are drawings for illustrating the score-assignment processes when the vehicle 1 makes a turn. In FIGS. 7A, 7B, examples are illustrated, in which the vehicle 1 traveling in the forward direction makes a turn from the traveling direction Dr1 to the left direction (the turn direction Dr3) and to the right direction (the turn direction Dr4). FIGS. 7A, 7B are the same as FIGS. 5A, 5B, except for the vehicle 1 making a turn.

In FIG. 7A, similarly to the score-assignment process illustrated in FIG. 5A, the score-assignment processing unit 34 performs the score-assignment process, so that the scores P21, P41 assigned to the images G1, G2 at the time when the object position is close to the traveling direction axis Y-Y' are larger than the scores P22, P42 assigned to the images G1, G2 at the time when the object position is distant from the traveling direction axis Y-Y'.

In FIG. 7B, similarly to the score-assignment process illustrated in FIG. 5B, the score-assignment processing unit 34 performs the score-assignment process, so that the scores Q22, Q42 assigned to the image G4 at the time when the object position is distant from the traveling direction axis Y-Y' are larger than the scores Q21, Q41 assigned to the image G4 at the time when the object position is close to the traveling direction axis Y-Y'.

By such the score-assignment process, even when the vehicle 1 makes a turn, the object is included within the priority image. Thus, setting the boundary near the object is avoided, and thus the deterioration of visibility of the overhead-view image is avoided.

[2] The Score-Assignment Process According to the Traveling Direction of the Vehicle 1 and the Displacement Direction of the Object The score-assignment processing unit 34 assigns different scores to the images G1-G4, assuming that the object position is the same, according to the combination of the traveling direction of the vehicle 1 and the displacement direction of the object.

In the following, explanation will be made for an example, in which the object displaces in the traveling direction of the vehicle 1 or in the opposite direction thereto, and for an example, in which the object displaces approaching to or departing from the traveling direction axis Y-Y' of the vehicle.

(1) The Case that the Displacement Direction of the Object is in the Traveling Direction of the Vehicle 1 or in the Opposite Direction Thereto The score-assignment processing unit 34 assigns scores to the images G1-G4, assuming that the object position is the same, so that the scores assigned to the images G1-G4 at the time when the object displaces in the opposite direction to the traveling direction of the vehicle 1 are larger than the scores assigned to the images G1-G4 at the time when the object displaces in the traveling direction. Examples will be illustrated in FIGS. 8-19.

1) The Case of the Vehicle 1 Traveling in the Front Direction

Figure 8A:
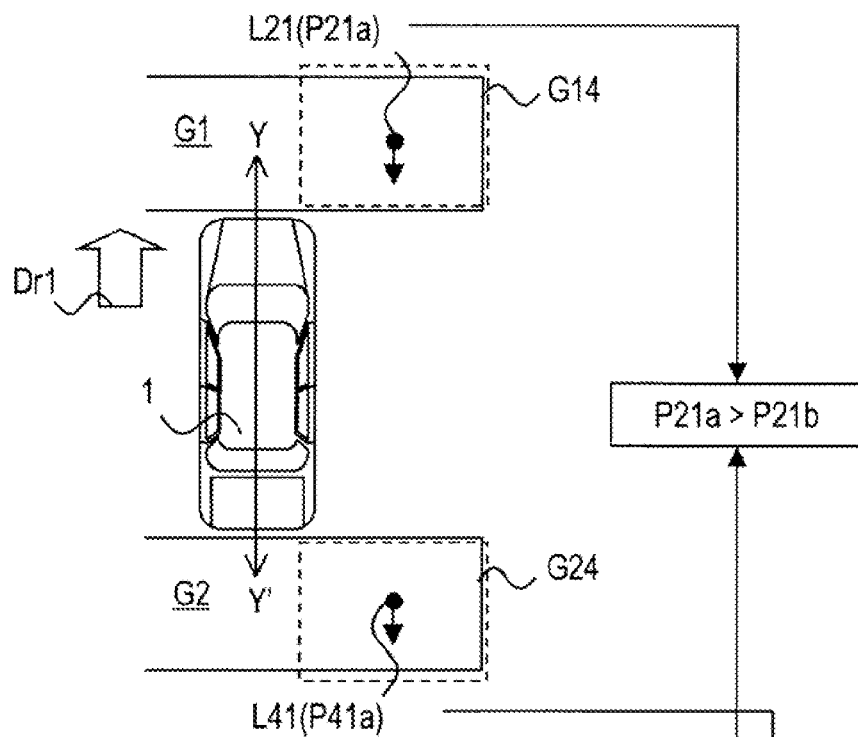
FIGS. 8A, 8B illustrate examples, in which the vehicle travels in the front direction.
Figure 8B:
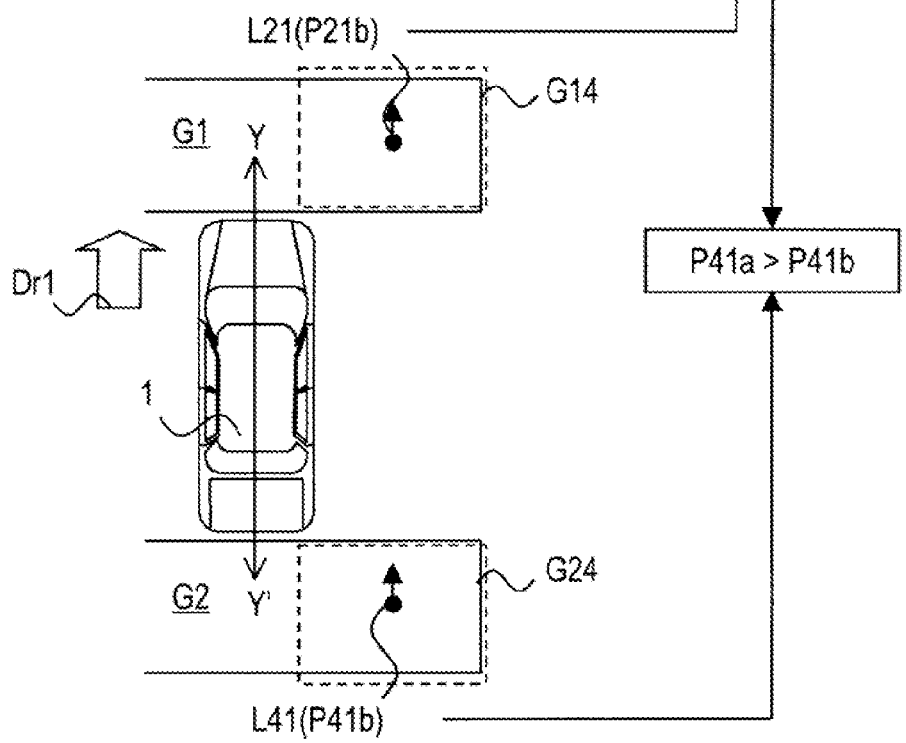
Figure 9A:
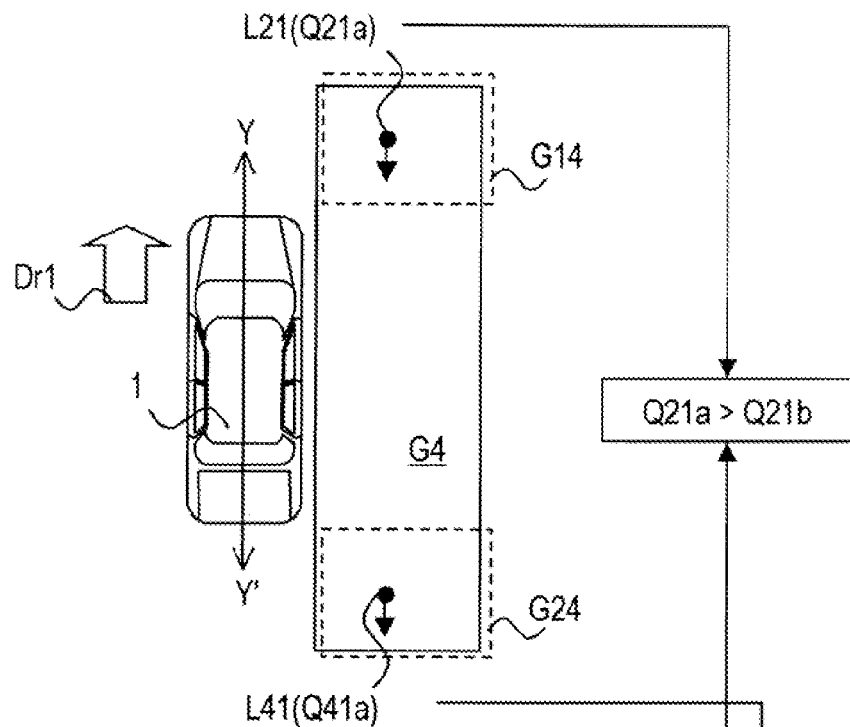
FIGS. 9A, 9B illustrate examples, in which the vehicle travels in the front direction.
Figure 9B:
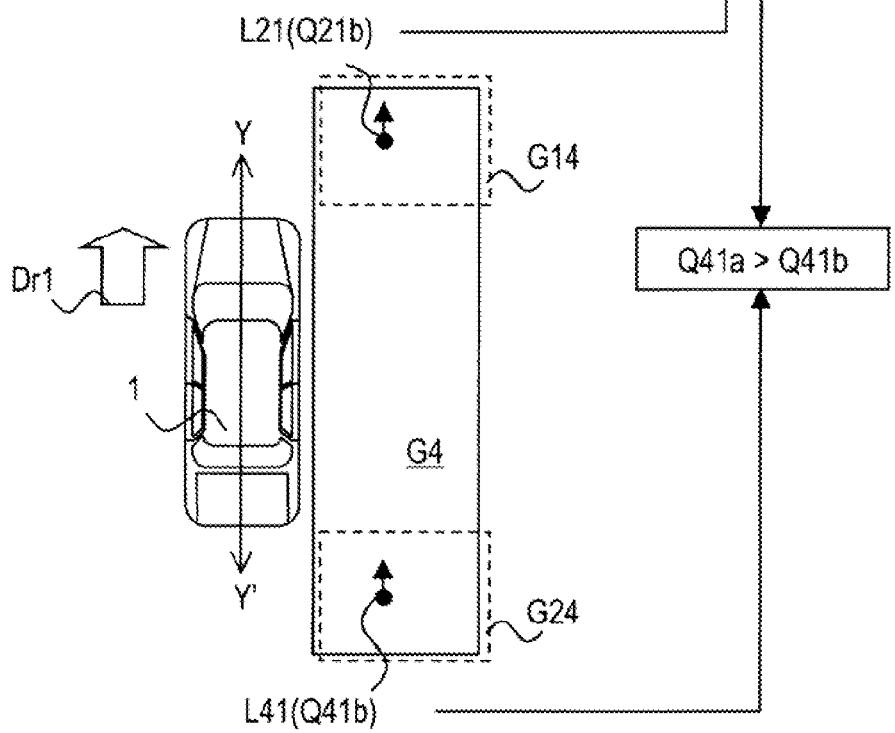

FIG. 8 and FIG. 9 are drawings illustrating examples of the traveling direction of the vehicle 1, the displacement direction of the object, and scores assigned to the image, when the vehicle 1 travels in the front direction. FIGS. 8A, 8B, and FIGS. 9A, 9B illustrate examples, in which the vehicle 1 travels in the front direction, the traveling direction Dr1.

In FIGS. 8A, 8B, there are illustrated examples, in which the object position L21 is detected within the image G1 of the front region and further within the overlapping region G14 thereof overlapping with the image G4 of the right region, and examples, in which the object position L41 is detected within the image G2 of the rear region and further within the overlapping region G24 thereof overlapping with the image G4 of the right region. In FIG. 8A, examples are illustrated, in which the object displaces, at the positions L21, L41, in the opposite direction to the traveling direction Dr1 of the vehicle 1. Also, in FIG. 8B, examples are illustrated, in which the object displaces, at the positions L21, L41, in the traveling direction Dr1 of the vehicle 1. Here, the illustrated positions L21, L41 correspond to the positions L21, L41 illustrated in FIG. 5A, and thus the following explanation is applicable to the positions L22, L42 in FIG. 5A.

In FIG. 8A, when the object displaces, at the position L21, in the opposite direction to the traveling direction Dr1, the score-assignment processing unit 34 assigns the image G1 a score P21$a$ as in the parenthesis. Also, when the object position displaces, at the position L41, in the opposite direction to the traveling direction Dr1, the score-assignment processing unit 34 assigns the image G2 a score P41$a$. Also, in FIG. 8B, when the object displaces, at the position L21, in the traveling direction Dr1, the score-assignment processing unit 34 assigns the image G1 a score P21$b$. Also, when the object position displaces, at the position L41, in the traveling direction Dr1, the score-assignment processing unit 34 assigns the image G2 a score P41$b$.

With respect to FIGS. 8A, 8B, the magnitude relations between the scores P21$a$, P21$b$ assigned to the image G1 and between the scores P41$a$, P41$b$ assigned to the image G2 are as follows.

$$P21a > P21b$$

$$P41a > P41b$$

In FIGS. 9A, 9B, there are illustrated examples, in which the object position L21 is detected within the image G4 of the right region and further within the overlapping region G14 thereof overlapping with the image G1 of the front region, and examples, in which the object position L41 is detected included within the image G2 of the rear region and further within the overlapping region G24. In FIG. 9A, examples are illustrated, in which the object displaces, at the positions L21, L41, in the opposite direction to the traveling direction Dr1 of the vehicle 1. Also, in FIG. 9B, examples are illustrated, in which the object displaces, at the positions L21, L41, in the traveling direction Dr1 of the vehicle 1. Here, the illustrated positions L21, L21 correspond to the positions L21, L41 illustrated in FIG. 5B, and thus the following explanation is applicable to the positions L22, L42 in FIG. 5B.

In FIG. 9A, when the object displaces, at the position L21, in the opposite direction to the traveling direction Dr1, the score-assignment processing unit 34 assigns the image G4 a score Q21$a$. Also, when the object position displaces, at the position L41, in the opposite direction to the traveling direction Dr1, the score-assignment processing unit 34 assigns the image G4 a score Q41$a$. Also, in FIG. 9B, when the object displaces, at the position L21, in the traveling direction Dr1, the score-assignment processing unit 34 assigns the image G4 a score Q21$b$. Also, when the object position displaces, at the position L41, in the traveling direction Dr1, the score-assignment processing unit 34 assigns the image G4 a score Q41$b$.

In FIGS. 9A, 9B, the magnitude relations between the scores Q21$a$, Q21$b$ and between the scores Q41$a$, Q41$b$, assigned to the image G4, are as follows.

$$Q21a > Q21b$$

$$Q41a > Q41b$$

2) The Case that the Vehicle 1 Travels in the Rear Direction

Figure 10A:
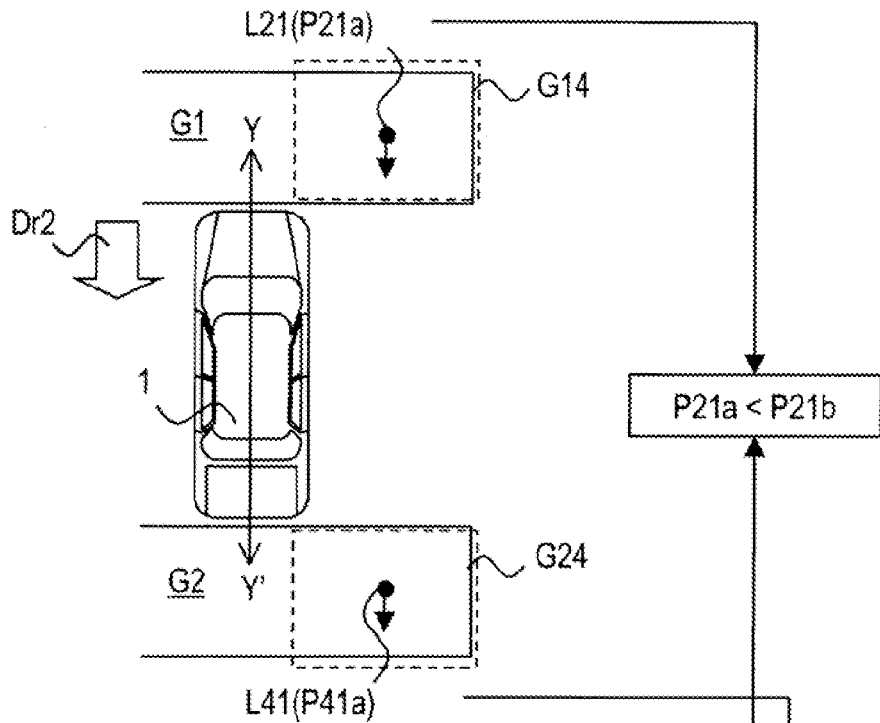
FIGS. 10A, 10B illustrate examples, in which the vehicle travels in the rear direction.
Figure 10B:
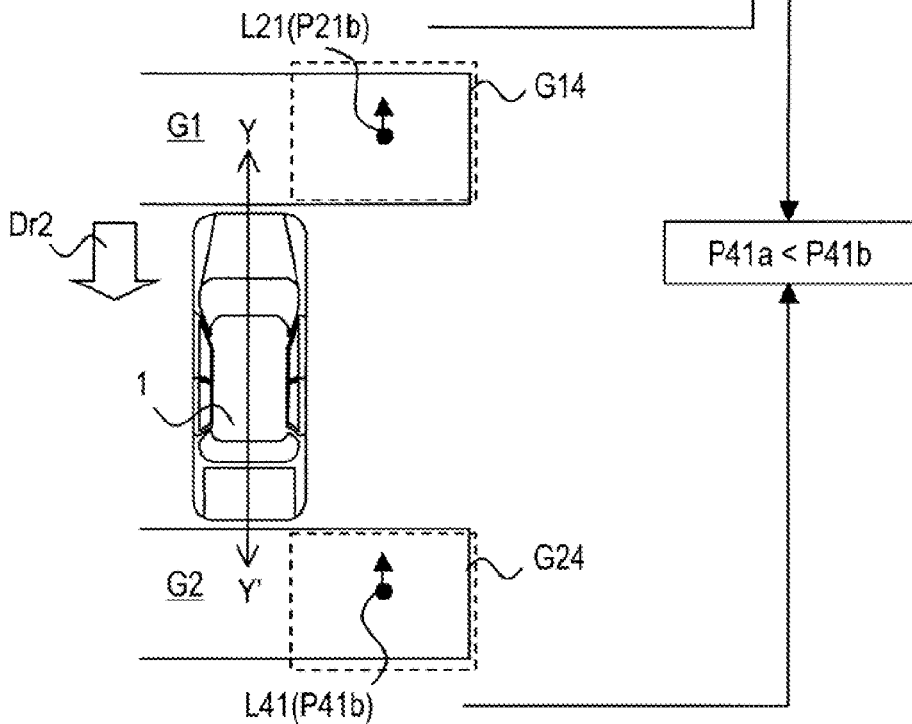
Figure 11A:
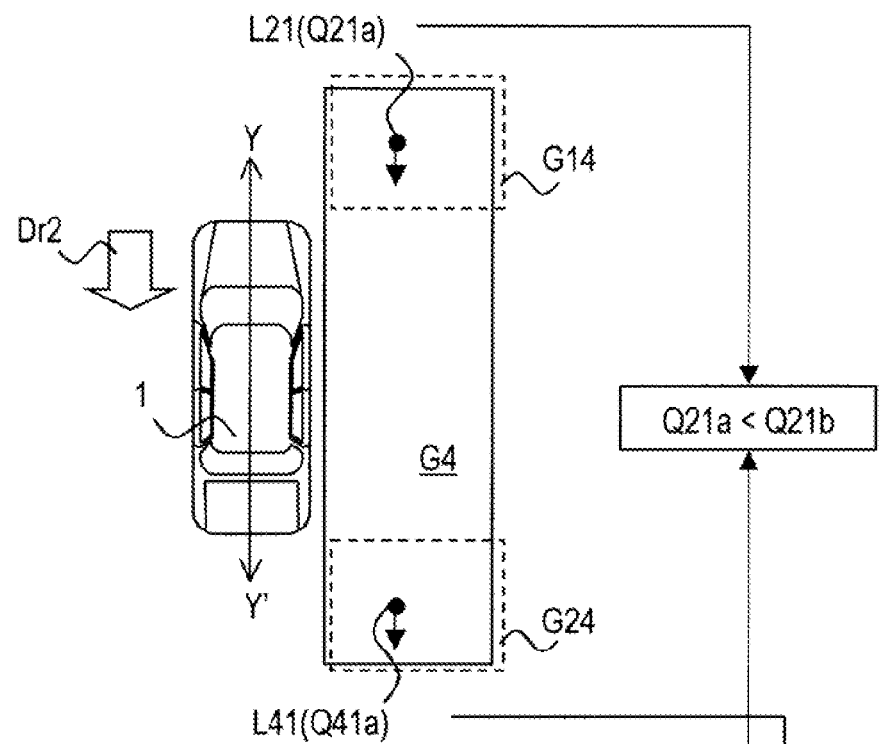
FIGS. 11A, 11B illustrate examples, in which the vehicle travels in the rear direction.
Figure 11B:
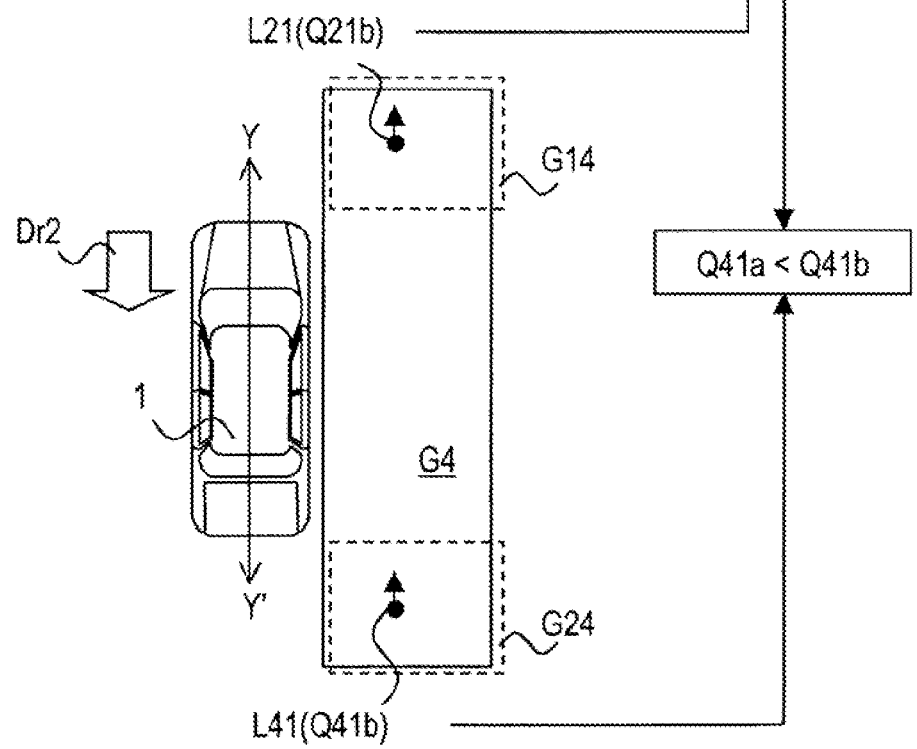

FIG. 10 and FIG. 11 are drawings illustrating examples of the traveling direction of the vehicle 1, the displacement direction of the object, and scores to be assigned, when the vehicle 1 travels in the rear direction. FIGS. 10A, 10B and FIGS. 11A, 11B illustrate examples, in which the vehicle 1 travels in the traveling direction Dr2 (the rear direction). FIGS. 10A, 10B are the same as FIGS. 8A, 8B, except for the traveling direction of the vehicle 1. Also, FIGS. 11A, 11B are the same as FIGS. 9A, 9B, except for the traveling direction of the vehicle 1. Here, FIG. 10A and FIG. 11A correspond to examples, in which the object displaces in the traveling direction Dr2 of the vehicle, and FIG. 10B and FIG. 11B correspond to examples, in which the object displaces in the opposite direction to the traveling direction Dr2 of the vehicle.

In FIGS. 10A, 10B, the magnitude relations between the scores P21$a$, P21$b$ assigned to the image G1 and between the scores P41$a$, P41$b$ assigned to the image G2 are as follows.

$$P21a < P21b$$

$$P41a < P41b$$

Also, with respect to FIGS. 11A, 11B, the magnitude relations between the scores Q21$a$, Q21$b$ and between the scores Q41$a$, Q41$b$, assigned to the image G4 are as follows.

$$Q21a < Q21b$$

$$Q41a < Q41b$$

3) The Case that the Vehicle 1 Makes a Turn

Figure 12A:
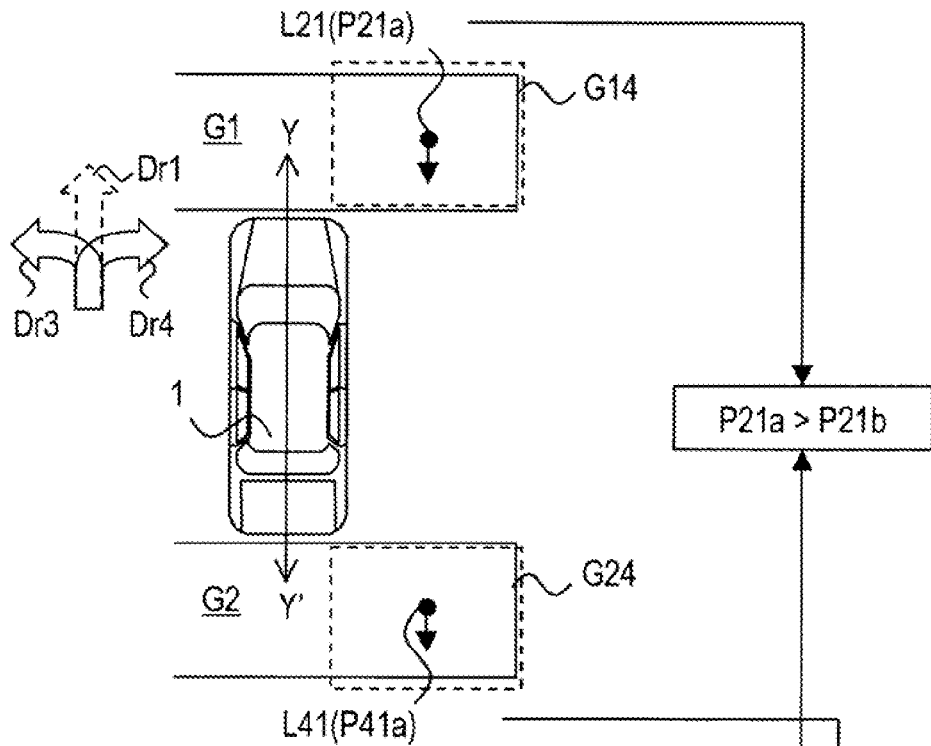
FIGS. 12A, 12B illustrate examples, in which the vehicle traveling in the front direction makes a turn to the left direction.
Figure 12B:
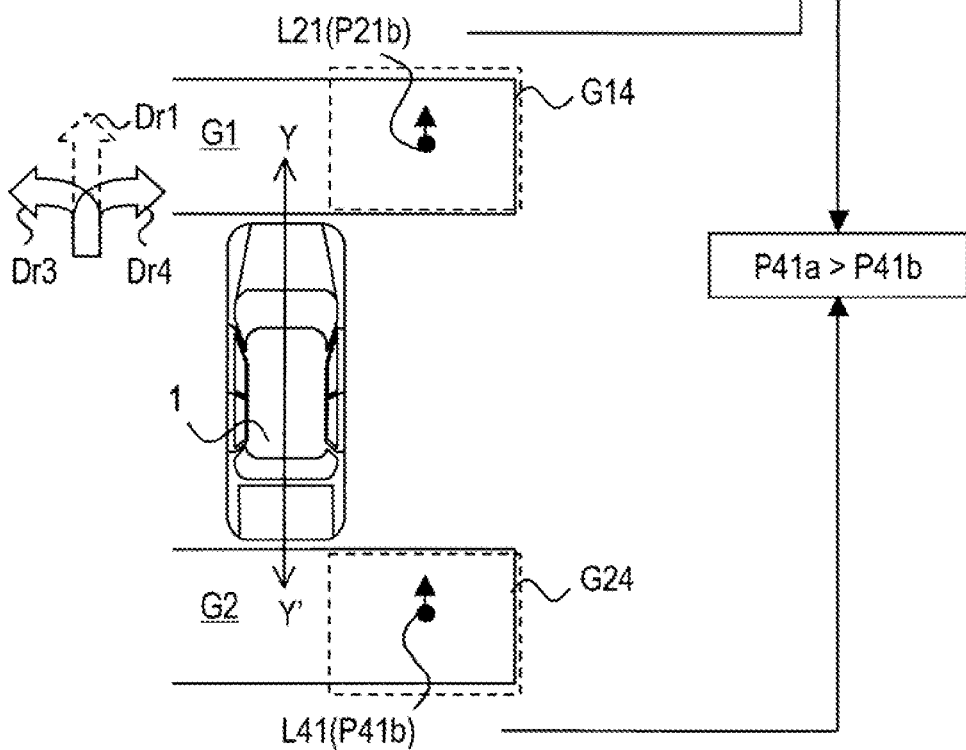
Figure 13A:
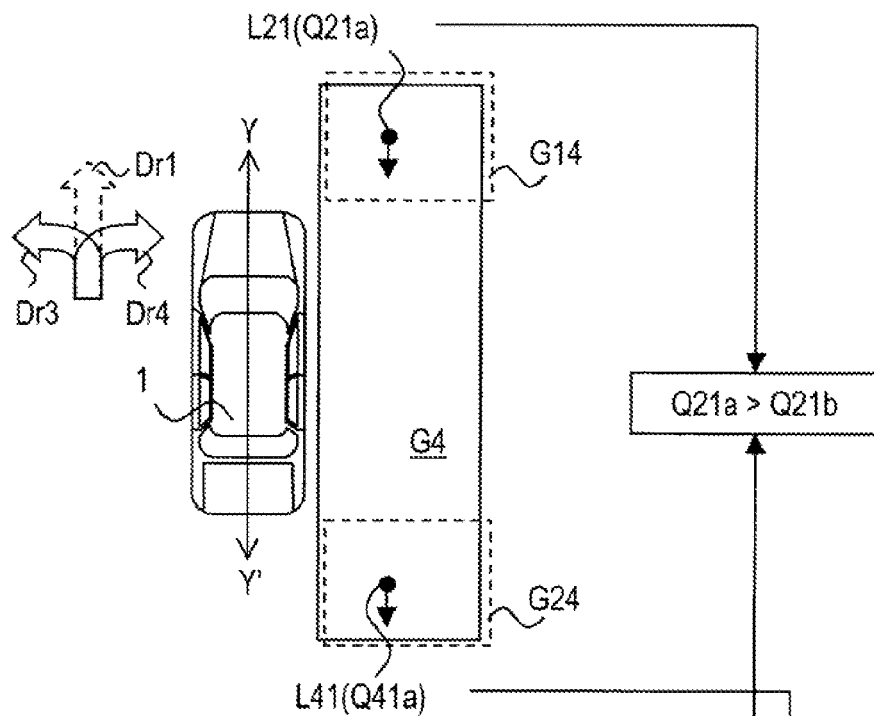
FIGS. 13A, 13B illustrate examples, in which the vehicle traveling in the front direction makes a turn to the left direction.
Figure 13B:
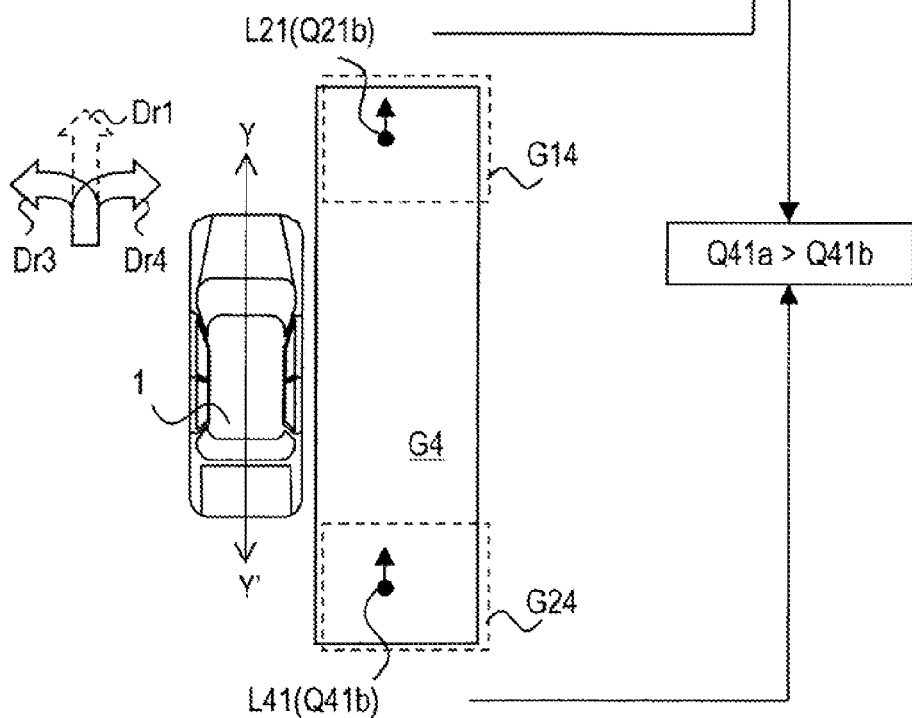

FIG. 12 and FIG. 13 are drawings illustrating examples of the turn direction of the vehicle 1 and the displacement direction of the object. FIGS. 12A, 12B and FIGS. 13A, 13B illustrate examples, in which the vehicle 1 traveling in the front direction makes a turn from the traveling direction Dr1 to the left direction (the turn direction Dr3) or to the right direction (the turn direction Dr4). FIGS. 12A, 12B are the same as FIGS. 8A, 8B, except for the vehicle 1 making a turn. Also, FIGS. 13A, 13B are the same as FIGS. 9A, 9B, except for the vehicle 1 making a turn.

In FIGS. 12A, 12B, the magnitude relations between the scores P21$a$, P21$b$ assigned to the image G1 and between the scores P41$a$, P41$b$ assigned to the image G2 are as follows.

$$P21a > P21b$$

$$P41a > P41b$$

Also, in FIGS. 13A, 13B, the magnitude relations between the score Q21$a$, Q21$b$ and between the scores Q41$a$, Q41$b$, assigned to the image G4, are as follows.

$$Q21a > Q21b$$

$$Q41a > Q41b$$

As such, when the vehicle 1 travels in the front or rear directions or makes a turn, scores are assigned to the images G1-G4, so that, assuming that the object position is the same, the scores assigned to the images G1-G4 at the time when the object displaces in the opposite direction to the traveling direction of the vehicle 1 are larger than the scores assigned to the images G1-G4 at the time when the object displaces in the traveling direction. Hence, for example, if an object displaces in the traveling direction or the opposite direction, that is, the object confronts the vehicle 1 thus being subject to a collision avoidance operation, the object is more likely to be included within the priority image. Therefore, setting the boundary near such the object is avoided, and deterioration of the visibility of the overhead-view image is also avoided.

(2) The Case that the Object Displaces Approaching to or Departing from the Traveling Direction Axis Y-Y' of the Vehicle 1) The Case that the Vehicle Travels Straight The score-assignment processing unit 34 assigns scores, so that, assuming that the object position is the same, the scores assigned to the images G1-G4 at the time when the object displaces approaching to the traveling direction axis Y-Y'of the vehicle 1 are larger than the scores assigned to the images G1-G4 at the time when the object displaces departing from the traveling direction axis Y-Y'.

Figure 14A:
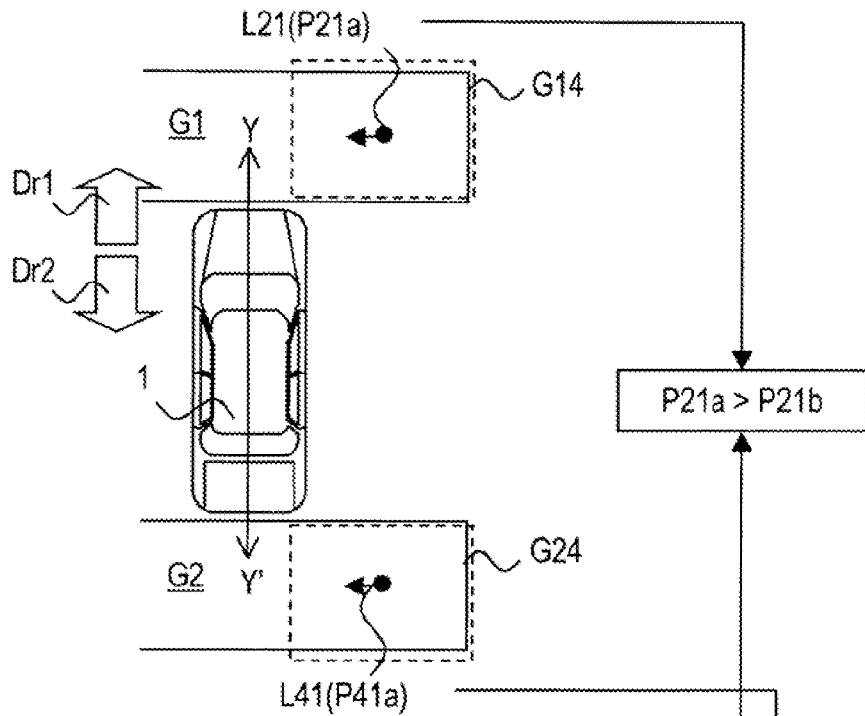
FIGS. 14A, 14B illustrate examples, in which the vehicle travels in the front and rear directions.
Figure 14B:
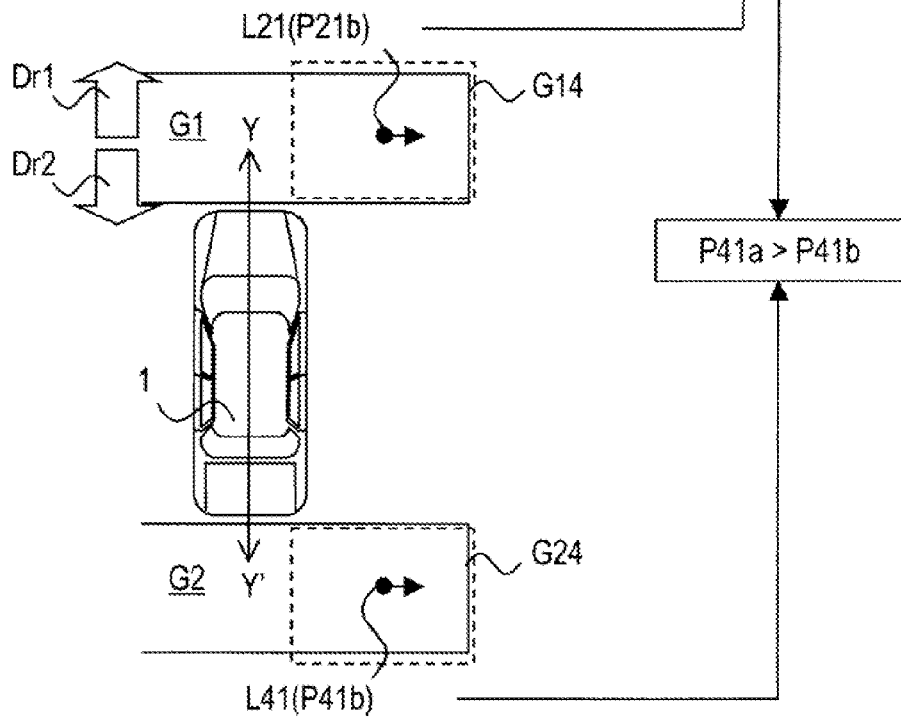
Figure 15A:
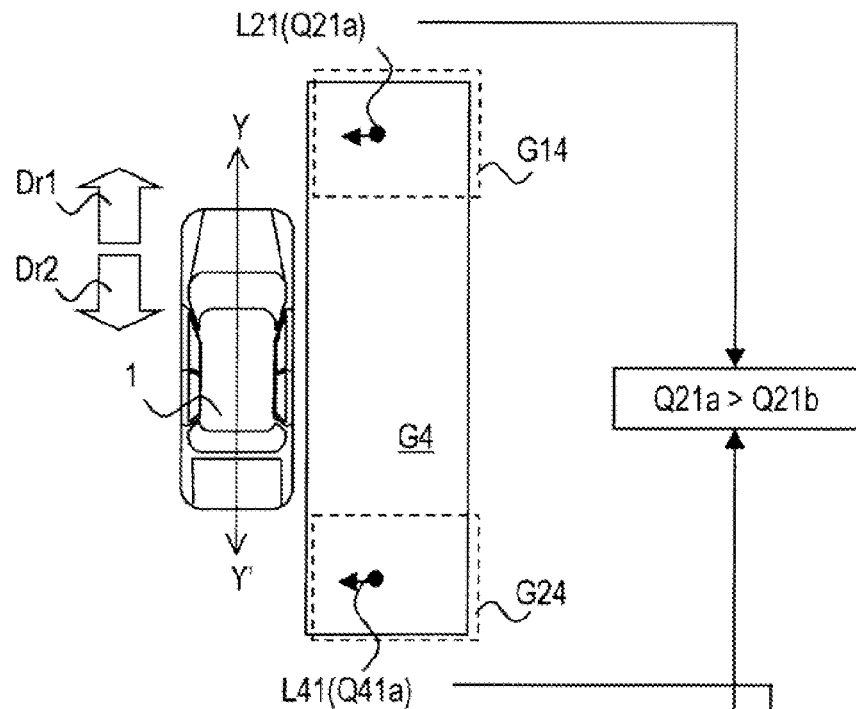
FIGS. 15A, 15B illustrate examples, in which the vehicle travels in the front and rear directions.
Figure 15B:
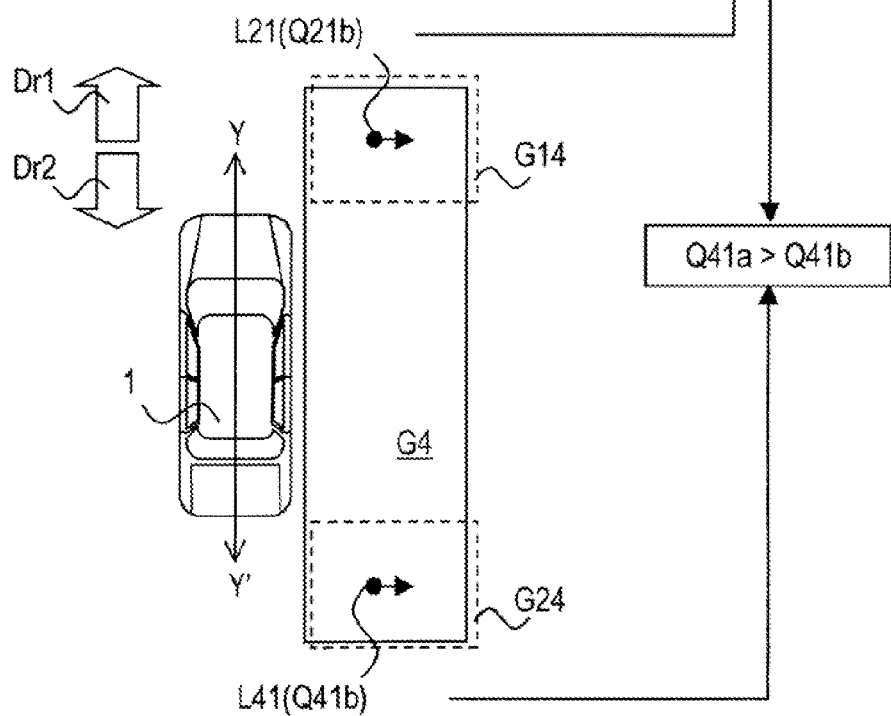

FIG. 14 and FIG. 15 illustrate examples of the displacement direction of the object with respect to the traveling direction axis Y-Y'of the vehicle 1 and the scores to be assigned, when the vehicle 1 travels in the front or rear directions. FIGS. 14A, 14B are the same as FIGS. 8A, 8B, except for the traveling direction of the vehicle 1 and the displacement directions of the object. Also, FIGS. 15A, 15B are the same as FIGS. 9A, 9B, except for the traveling direction of the vehicle 1 and the displacement directions of the object. FIGS. 14A, 14B and FIGS. 15A, 15B illustrate examples, in which the vehicle 1 travels in the traveling directions Dr1 (traveling in the front direction) and in Dr2 (traveling in the rear direction). Also, FIG. 14A and FIG. 15A illustrate examples, in which the object displaces, at the positions L21, L41, approaching to the traveling direction axis Y-Y', and FIG. 14B and FIG. 15B illustrate examples, in which the object displaces, at the positions L21, L41, departing from the traveling direction axis Y-Y'.

In FIGS. 14A, 14B, the magnitude relations between the scores P21$a$, P21$b$ assigned to the image G1 and between the scores P41$a$, P41$b$ assigned to the image G2 are as follows.

P21$a$>P21$b$

P41$a$>P41$b$

Also, in FIGS. 15A, 15B, the magnitude relations between the scores Q21$a$, Q21$b$ and between the scores Q41$a$, Q41$b$, assigned to the image G4, are as follows.

Q21$a$>Q21$b$

Q41$a$>Q41$b$

As such, in the score-assignment process when the vehicle 1 travels straight, scores are assigned so that the scores assigned to the images G1-G4 at the time when the object displaces approaching to the traveling direction axis Y-Y'of the vehicle 1 are larger than the scores assigned to the images G1-G4 at the time when the object displaces departing from the traveling direction axis Y-Y' of the vehicle 1. Thereby, such an object as is likely to approach to the vehicle 1, thus being subject to, for example, a collision avoidance operation, is included within the priority image. Hence, setting the boundary near such the object is avoided, and thus the deterioration of the visibility of the overhead-view image is avoided.

2) The Case that the Vehicle Makes a Turn

When the vehicle 1 makes a turn to either the left or right direction, the score-assignment processing unit 34 assigns scores so that, assuming that the object position is the same, the scores assigned to the images G1-G4 at the time when the object displaces in the opposite direction to the turn direction of the vehicle 1 are larger than the scores assigned to the images G1-G4 at the time when the object displaces in the turn direction of the vehicle 1.

Figure 16A:
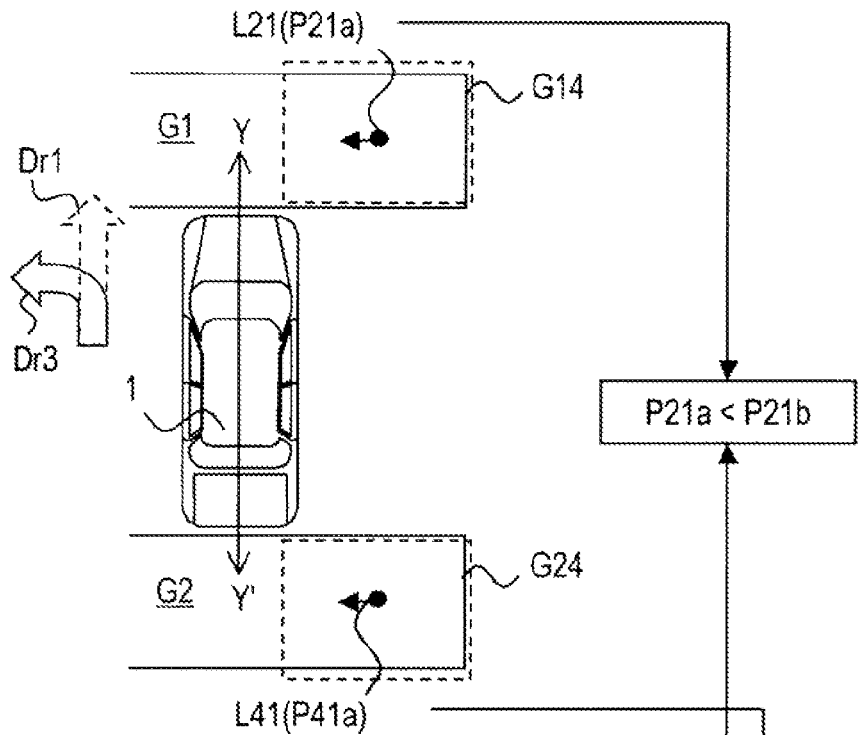
FIGS. 16A, 16B illustrate examples, in which the vehicle makes a left turn.
Figure 16B:
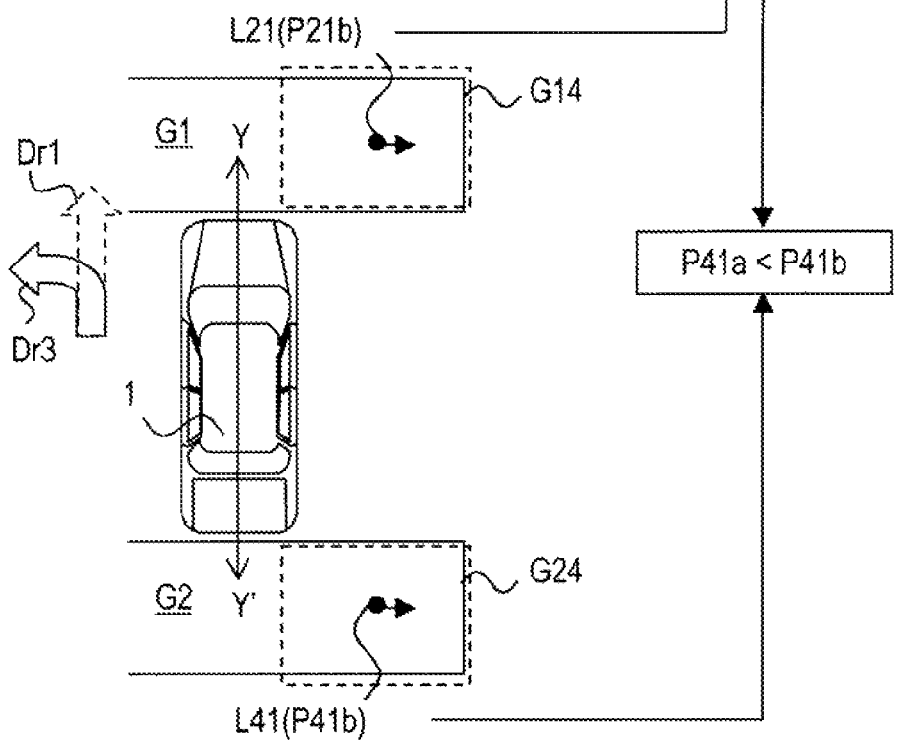
Figure 17A:
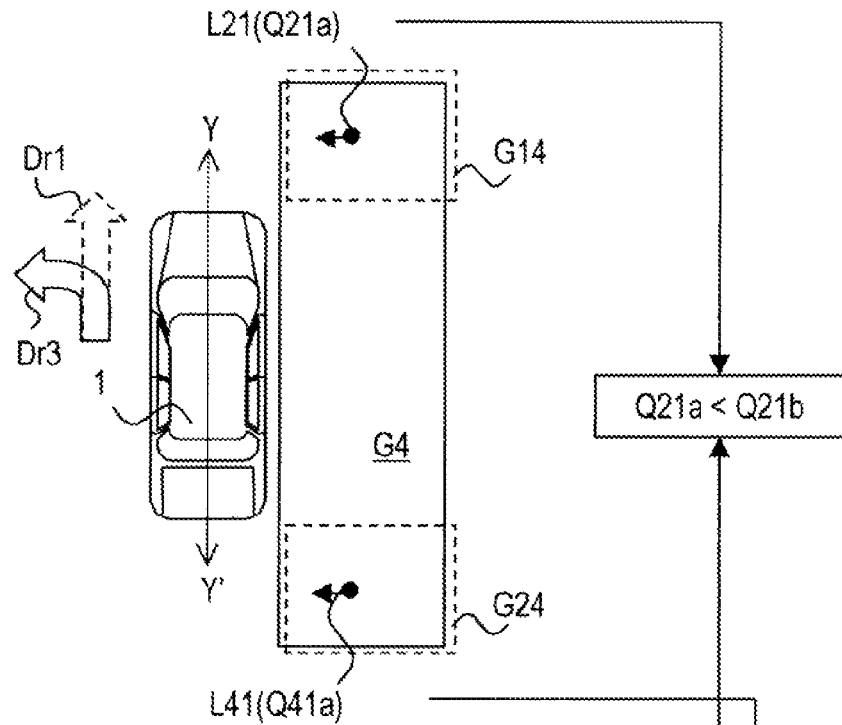
FIGS. 17A, 17B illustrate examples, in which the vehicle makes a left turn.
Figure 17B:
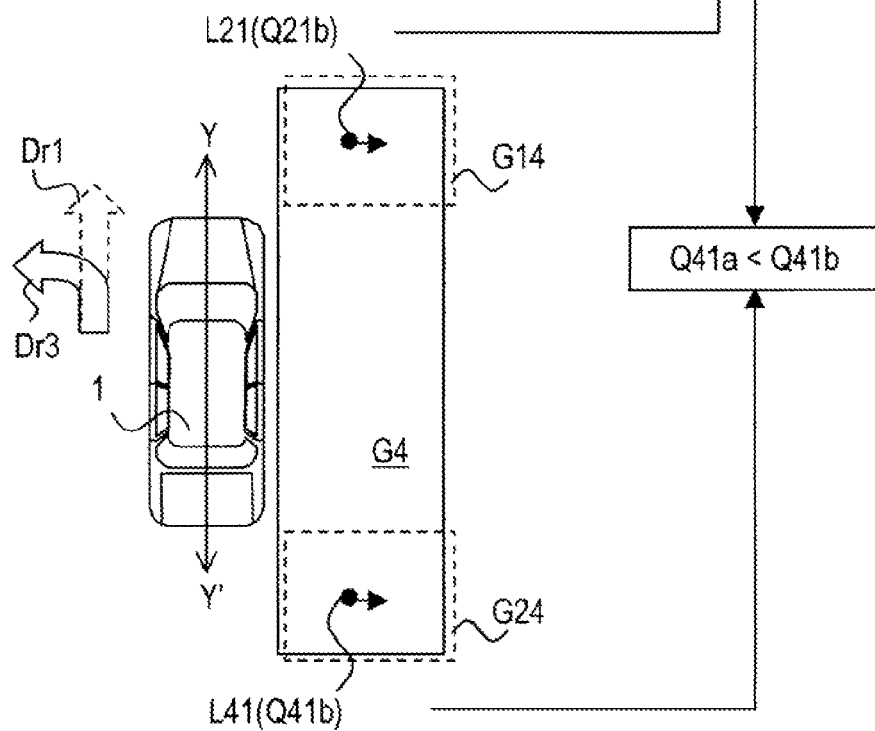

FIG. 16 and FIG. 17 are drawings illustrating examples of the displacement directions of the object with respect to the traveling direction of the vehicle 1 and the scores to be assigned, when the vehicle 1 makes a left turn. FIGS. 16A, 16B, and FIGS. 17A, 17B illustrate examples, in which the vehicle 1 makes a left turn (the turn direction Dr3) from the traveling direction Dr1. FIGS. 16A, 16B are the same as FIGS. 14A, 14B, except for the vehicle 1 making a left turn. Also, FIGS. 17A, 17B are the same as FIGS. 15A, 15B, except for the vehicle 1 making a left turn.

In FIGS. 16A, 16B, the magnitude relations between the scores P21$a$, P21$b$ assigned to the image G1 and between the scores P41$a$, P41$b$ assigned to the image G2 are as follows.

P21$a$<P21$b$

P41$a$<P41$b$

Also, in FIGS. 17A, 17B, the magnitude relations between the scores Q21$a$, Q21$b$ and between the scores Q41$a$, Q41$b$, assigned to the image G4, are as follows.

Q21$a$<Q21$b$

Q41$a$<Q41$b$

Figure 18A:
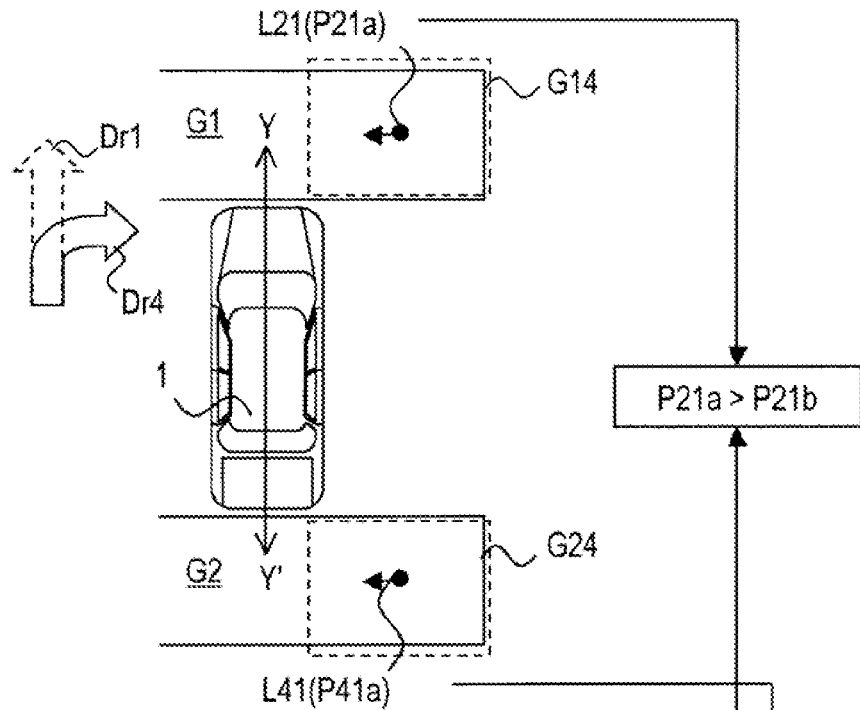
FIGS. 18A, 18B illustrate examples, in which the vehicle makes a right turn.
Figure 18B:
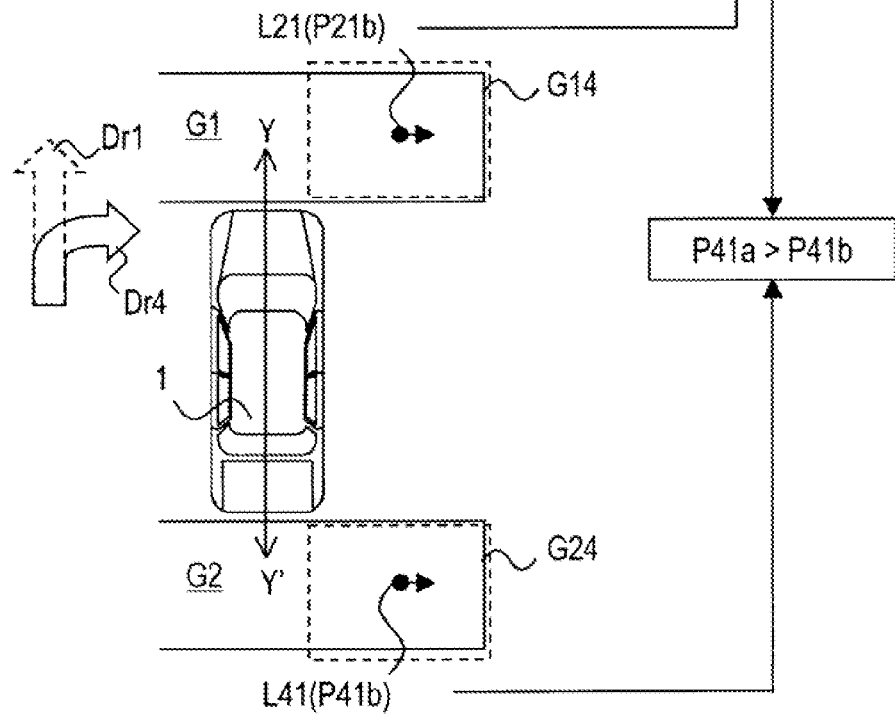
Figure 19A:
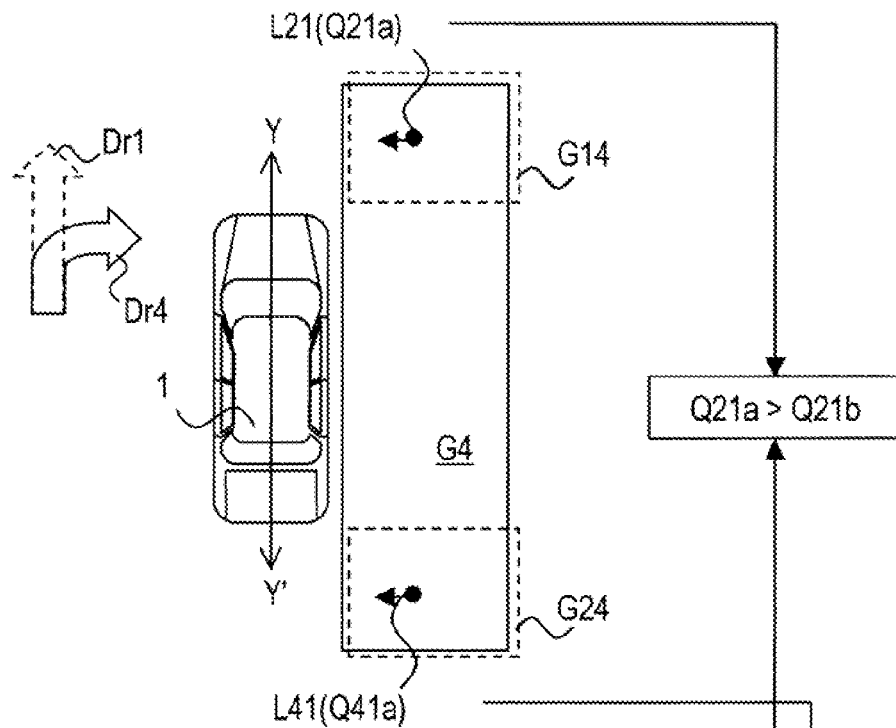
FIGS. 19A, 19B illustrate examples, in which the vehicle makes a right turn.
Figure 19B:
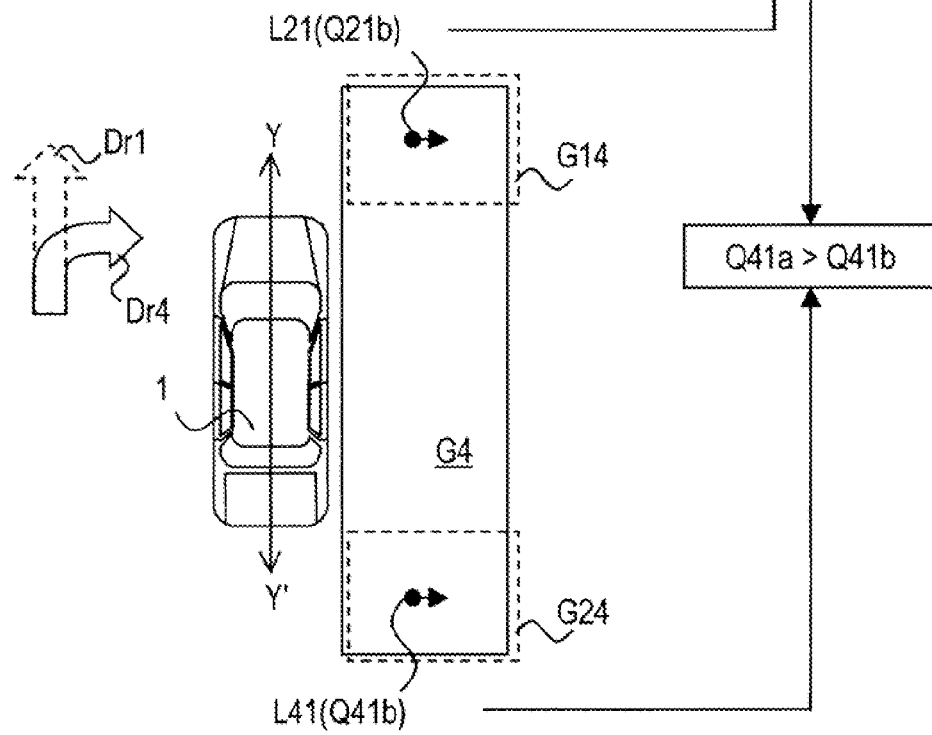

In FIG. 18 and FIG. 19 are drawings illustrating examples of the displacement direction of the object with respect to the traveling direction of the vehicle 1 and the scores to be assigned, when the vehicle 1 makes a right turn. FIGS. 18A, 18B and FIGS. 19A, 19B illustrate examples, in which the vehicle 1 makes a right turn (the turn direction Dr4) from the traveling direction Dr1. FIGS. 18A, 18B are the same as FIGS. 14A, 14B, except for the vehicle 1 making a right turn. Also, FIGS. 19A, 19B are the same as FIG. 15A, 15B, except for the vehicle 1 making a right turn.

In FIGS. 18A, 18B, the magnitude relations between the scores P21$a$, P21$b$ assigned to the image G1 and between the scores P41$a$, P41$b$ assigned to the image G2 are as follows.

P21$a$>P21$b$

P41$a$>P41$b$

Also, in FIGS. 19A, 19B, the magnitude relations between the scores Q21$a$, Q21$b$ assigned to the image G4 and between the score Q41$a$, Q41$b$ are as follows.

Q21$a$>Q21$b$

Q41$a$>Q41$b$

As such, in the score-assignment process, when the vehicle 1 makes either left or right turn, the scores are assigned so that, assuming that the object position is the same, the scores assigned to the images G1-G4 at the time when the object displaces in the opposite direction to the turn direction of the vehicle 1 are larger than the scores assigned to the images G1-G4 at the time when the object displaces in the turn direction of the vehicle 1. Thereby, if an object confronts the vehicle 1 in the turn direction, thus being subject to, for example, a collision avoidance operation, the object is included within the priority image. Hence, setting the boundary near such the object is avoided, and thus a deterioration of the visibility of the overhead-view image is avoided.

In the above described score-assignment process, for example, score maps as described below are used. The image processing apparatus 4 has, for example, for each of the image data G1-G4, a score map previously stored in the ROM 22, which corresponds to the traveling direction of the vehicle 1 and the displacement direction of the object. The score-assignment processing unit 34 selects a score map corresponding to the traveling direction of the vehicle 1 and the displacement direction of the object. Then, the score-assignment processing unit 34 determines, according to the selected score map, the score corresponding to the object position and performs a score-assignment process.

FIGS. 20A-20E are drawings illustrating the score maps. FIG. 20A schematically illustrates score maps for the image data G1 of the front region and the image data G2 of the rear region. In FIG. 20A, score map for each traveling direction of the vehicle 1 is illustrated, for the cases of traveling in the front and rear directions. Hereafter, the displacement direction of the object is defined as follows for an illustrative purpose.

The traveling direction of the vehicle 1: "forward direction"

The opposite direction to the traveling direction of the vehicle 1: "the opposite direction"

The direction approaching to the traveling direction axis Y-Y': "the inward direction"

The direction departing from the traveling direction axis Y-Y': "the outward direction"

In FIG. 20A, score maps for displacement directions of the object are represented along the vertical axis, for example, "forward-direction score map", "the opposite-direction score map", "the inward-direction score map", and "the outward-direction score map". Also, indicated along the horizontal axis is the score for each object position according to each score map. The object position are described, according to the distance to the traveling direction axis Y-Y', as "close" or "distant". In FIG. 20A, at all score maps for all the displacement directions, scores P101-P104 for the object position "close" are respectively larger than scores P201-P204 for the object position "distant". Also, between the score maps, the scores P102, P202 of the opposite-direction score map are larger than the scores P101, P201 of the forward-direction score maps. Also, the scores P103, P203 of the inward-direction score map are respectively larger than the scores P104, P204 of the outward-direction score map.

FIG. 20B schematically illustrates the score maps for the image data G3 in the left direction and the image data G4 of the right region when the vehicle travels in the forward or rear direction. Here, at all the score maps for all the displacement directions, scores Q101-Q104 for the object positions "close" are respectively larger than scores Q201-Q204 for the object positions "distant". Also, between the score maps, the scores Q102, Q202 of the opposite-direction score map are respectively larger than scores Q101, Q201 of the forward-direction score map. Also, the scores Q103, Q203 of the inward-direction score map are respectively larger than the scores Q104, Q204 of the outward-direction score map.

FIG. 20C schematically illustrates the score maps for the image data G1 of the front region and the image data G2 of the rear region when the vehicle makes a turn from the forward travel direction. Here, at all the score maps for all the displacement directions, scores P301-P304 for the object position "close" are respectively larger than scores P401-P404 for the object position "distant". Also, between the score maps, the scores P302, P402 of the opposite-direction score map are respectively larger than the score P301, P401s of the forward-direction score map. On the other hand, the scores P303, P403 of the inward-direction score map are respectively larger than the scores P304, P404 of the outward-direction score map.

FIG. 20D schematically illustrates the score maps for the image data G3 or G4, whichever corresponds to the turn direction when the vehicle makes a turn. Forward direction and the opposite direction are based on the traveling direction before the vehicle makes a turn, that is, the front direction. Also, the inward direction corresponds to the opposite direction to the turn direction, and the outward direction corresponds to the turn direction. Here, at the all the score maps for all the displacement directions, scores Q301-Q304 for the object position "close" are respectively larger than scores Q401-Q404 for the object position "distant". Also, between the score maps, the scores Q301, Q401 of the forward-direction score map are respectively larger than the scores Q302, Q402 of the opposite-direction score map. Also, the scores Q303, Q403 of the inward-direction score map are respectively larger than the scores Q304, Q404 of the outward-direction score map.

FIG. 20E schematically illustrates the score maps for the image data G3 or G4, whichever corresponds to the opposite direction for the turn direction, when the vehicle makes a turn. The forward direction and the opposite direction are based on the traveling direction before the vehicle makes a turn, that is, the front direction. Also, the inward direction corresponds to the turn direction, and the outward direction corresponds to the opposite direction to the turn direction. Here, at all the score maps for all the displacement directions, scores Q305-Q308 for the object position "close" are respectively larger than scores Q405-Q408 for the object position "distant". Also, between the score maps, the scores Q306, Q406 of the opposite-direction score map are respectively larger than the scores Q305, Q405 of the forward-direction score map. On the other hand, the scores Q308, Q408 of the outward-direction score map are respectively larger than the scores Q307, Q407 of the inward-direction score map.

Next, an example of a process using more specific score maps will be explained according to FIG. 21, with occasional reference to FIGS. 22-24.

Figure 21:
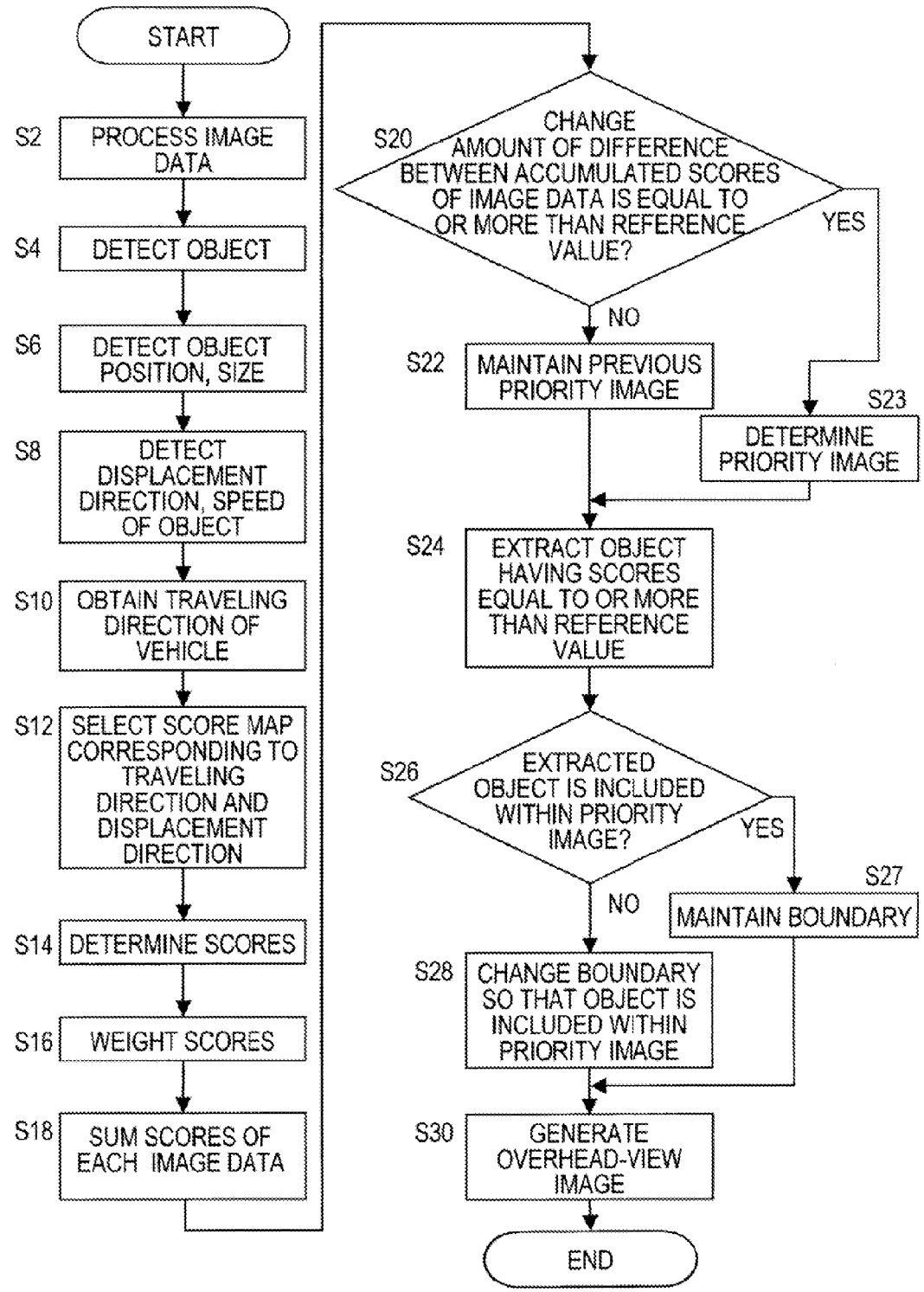
FIG. 21 is a flow-chart diagram illustrating operational steps of the image processing apparatus.

FIG. 21 is a flow-chart diagram illustrating operational steps of the image processing apparatus 4. The steps of FIG. 21 correspond to steps performed by the image processing unit 30, the object-detecting unit 32, the score-assignment processing unit 34, the boundary-determining unit 36, and the overhead-view image-generating unit 38. Steps of FIG. 21 are performed, for example, in every imaging cycle.

Figures 22A, 22B:
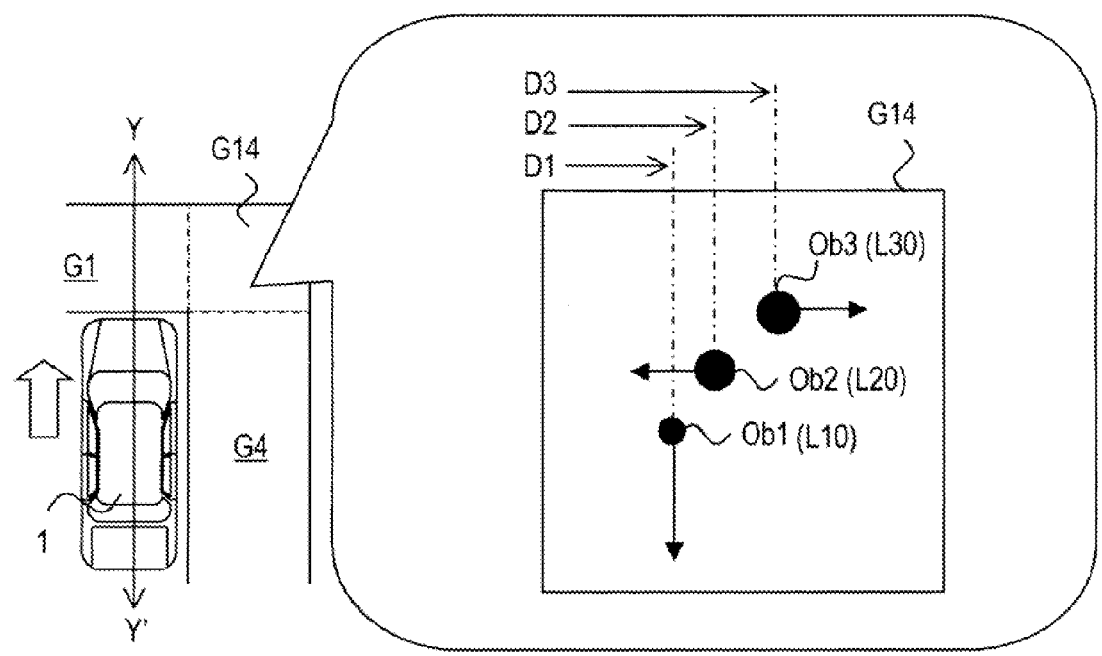
FIGS. 22A and 22B illustrate examples of the detected object.

The image processing unit 30 image processes the image data of the images G1-G4 (S2). Then, the object detecting unit 32 detects an object from the image data G1-G4 (S4). Here, in FIGS. 22A and 22B, the detected objects are exemplified. In FIG. 22A, an example is illustrated, in which objects Ob1-Ob3 are detected within the image G1 of the front region, the image G4 of the right region, and the overlapping region G14 thereof, when the vehicle 1 travels in the front direction. The objects Ob1-Ob3 are respectively, for example, a ball, a child, and an adult passing near the vehicle 1.

Next, the object detecting unit 32 detects a position and a size of each object (S6). In an example of FIG. 22A, a position L10 of the object Ob1 (the distance D1 from the traveling direction axis Y-Y'), a position L20 of the object Ob2 (the distance D2(>D1) from the traveling direction axis Y-Y'), and a position L30 of the object Ob3 (the distance D3(>D2) from the traveling direction axis Y-Y') are detected. Also, the sizes of the objects Ob1-Ob3 are such as "small" for the object Ob1, "medium" for the object Ob2, and "medium" for the object Ob3. The detected positions and sizes of the objects are described in a table in FIG. 22B.

Next, the object detecting unit 32 detects a displacement direction and a displacement speed of each object (S8). For example, in FIG. 22A, the displacement direction of the object Ob1 is the opposite direction to the traveling direction of the vehicle 1, that is, the "opposite direction". Also, the displacement direction of the object Ob2 is a direction approaching to the traveling direction axis Y-Y' of the vehicle 1, that is, the "inward direction". Then, the displacement direction of the object Ob3 is a direction departing from the traveling direction axis Y-Y' of the vehicle 1, that is, the "outward direction". Also, the displacement speeds of the objects Ob1-Ob3 are such as "fast" for the object Ob1, "slow" for the object Ob2, and "slow" for the object Ob3. The displacement directions and the displacement speeds of the objects are described in a table of FIG. 22B.

Then, the score-assignment processing unit 34 obtains the traveling direction of the vehicle (S10), and selects the score map corresponding to the traveling direction and the displacement direction of the object (S12). Then, the score-assignment processing unit 34 determines the score for the position according to the selected score map (S14).

Here, in FIGS. 23A-23B, examples of the score map to be selected for the objects Ob1-0b3 are illustrated. In each score map illustrated in FIGS. 23A-23C, scores "5" to "1" are mapped to the X-coordinates (X0-X7) and the Y-coordinates (Y0-Y7). Here, Y-axes correspond to the traveling direction axis Y-Y' of the vehicle 1. In FIG. 23A, there are illustrated the score map PM10 for the image G1 and the score map PM12 for the image G4, at the time when the vehicle travels in the front direction and the displacement direction of the object is the opposite direction. Also, in FIG. 23B, there are illustrated the score map PM14 for the image G1 and the score map PM16 for the image G4, at the time when the vehicle travels in the front direction and the displacement direction of the object is the inward direction. Then, in FIG. 23C, there are illustrated the score map PM18 for the image G1 and the score map PM20 for the image G4, at the time when the vehicle travels in the front direction and the displacement direction of the object is the outward direction.

For the object Ob1, which displaces in the opposite direction, the score maps PM10, PM12 in FIG. 23A are selected. Here, the coordinates of the position L10 of the object Ob1 is (X2,Y4). Then, according to the score map PM10, the score "5" is determined to be assigned to the image G1. On the other hand, according to the score map PM 12, the score "2" is determined to be assigned to the image G4.

Also, for the object Ob2, which displaces in the inward direction, the score maps PM14, PM16 of FIG. 23B are selected. Here, the coordinates of the position L20 of the object Ob2 is (X2,Y3). Then, according to the score map PM14, the score "5" is determined to be assigned to the image G1. On the other hand, according to the score map PM16, the score "1" is determined to be assigned to the image G4.

Then, for the object Ob3, which displaces in the outward direction, the score maps PM18, PM20 of FIG. 23C are selected. Here, the coordinates of the position L30 of the object Ob3 is (X4,Y3). Then, according to the score map PM18, the score "2" is determined to be assigned to the image G1. On the other hand, according to the score map PM20, the score "2" is determined to be assigned to the image G4.

Further, at the step S14, the score-assignment processing unit 34 determines the score according to the sizes and the displacement speeds of the objects Ob1-Ob3. Here, the scores may be determined, for example, by using map data previously stored in the ROM 22, in which the sizes and the displacement speeds are sorted and related to scores, or by a calculation.

In the score determination based upon the size, the score is determined so that the score for a larger object size is larger than the score for a smaller object size. In an example of FIG. 22B, the score "1" is determined to be assigned to the "small" object Ob1, and the score "2" is determined to be assigned to the "medium" objects Ob2, Ob3.

Also, in the score determination based upon the displacement speed, assuming that the object position is the same, the scores are determined so that the score for a larger displacement speed is larger than the score for smaller displacement speed. In an example of FIG. 22, the score "3" is determined to be assigned to the "fast" object Ob1, and the score "1" is determined to be assigned to the "slow" objects Ob2, Ob3. As such, by assigning the images G1 or G4 scores according the size and the displacement speed of the object, a large object or an object of faster displacement speed, which is possibly subject to a collision avoidance operation, is more likely to be included within the priority image. Hence, deterioration of visibility of the overhead-view image including such the object is avoided.

The scores determined at the step S14 are illustrated in FIG. 24. In FIG. 24A, scores assigned to the image G1 are described. Here, there are illustrated scores determined according to the object positions and scores determined according to the sizes and the displacement speeds of the object, based upon the score map selected for each object. Also, in FIG. 24B, scores assigned to the image G4 are illustrated in the same manner.

Subsequently, the score-assignment processing unit 34 performs a weighting process to the scores (S16). In the score weighting process, for example, the scores according to the object position, the displacement speed, and the size are weighted to become smaller in that order. For example, with a score PP according to the position, a score VP according to the displacement speed, a score SP according to the size, the weighted score is calculated by the following formula.

the weighted score=PP*p*VP*v*SP*s (coefficient: p=3, v=2, s=1)

Here, by modifying the coefficients p, v, and s, the factor to be prioritized in the score-assignment process is arbitrarily controlled. For example, the position, the displacement speed, and the size are prioritized from high to low priorities in that order, here. Also, the above formula is an example for illustrative purpose, and, for example, the sum of the scores PP, VP, and SP weighted by the coefficients p, v, and s may be calculated.

Then, the score-assignment processing unit 34 sums the scores of each image (S18). In the example of FIG. 22, the summed score as illustrated in FIGS. 24C, 24D are determined by the above formula. In FIG. 24C, the sum "174" of the scores in FIG. 24A is illustrated. This summed score is assigned to the image G1. Also, in FIG. 24D, the sum "72" of the scores in FIG. 24B is illustrated. This summed score is assigned to the image G4.

Then, the score-assignment processing unit 34 determines whether or not the change amount of the difference between the summed scores of the images is equal to or greater than the reference amount (S20). For example, in the above case, the difference between the summed scores of the images G1, G4 is 102 (=174−72). The score-assignment processing unit 34 determines, for example, in every imaging cycle, the difference between the summed scores of the images, and stores the same in the RAM 23. Then, it is determined whether or not the change amount of each cycle is equal to or greater than the reference amount. For example, if the previous difference is "90", the change amount of the difference is "+12". Here, with the reference amount being "10", the determination result will be "Yes". On the other hand, if the change amount is less than the reference amount, the determination result will be "No".

If the determination result at the step S20 is "No", the score-assignment processing unit 34 maintains the priority image of the previous cycle (S22). On the other hand, if the determination result at the step S20 is "Yes", the score-assignment processing unit 34 determines the priority image according to the summed score (S23). For example, the image having a larger summed score will be determined as the priority image. In the example of FIG. 22A, 22B, with the summed score for the image G1 being "174", and the summed score for the image G4 being "72", since the summed score for the image G1 is larger, the image G1 is determined as the priority image. Thereby, at the subsequent steps, the boundary determining unit 36 changes the previously determined boundary to the newly determined boundary when the time-dependent change amount of the difference of the score is equal to or greater than the reference amount, or maintains the previously determined boundary when the change amount is less than the reference amount. Hence, frequent change of the priority image and thus of the boundary is avoided, and thus the deterioration of the visibility of the overhead-view image is avoided.

Then, the boundary determining unit 36 extracts the objects having scores equal to or larger than a reference value (S24). Then, the boundary determining unit 36 maintains the boundary (S27) when the extracted objects are included within the priority image (Yes at S26), or changes the boundary so that the objects are included within the priority image (S28) when the extracted objects are not included within the priority image (No at S26). The reference value is a value for screening a plurality of the objects, which is arbitrary set. In the case that the number of the objects is relatively large, by setting such the reference value, frequent change of the boundary at the step S28 is avoided.

The above process is performed to the images G2, G3. Then, the overhead-view image generating unit 38 joins the images G1-G4 to generate the overhead-view image (S30).

In the above description, the score-assignment processing unit 34 performs the score-assignment process according to each object position detected in every imaging cycle. The score-assignment processing unit 34 may perform the above score-assignment process according to, instead of the detected object position, a position predicted from the previous object position. In that case, the object detecting unit 32 predicts, for example, based upon the displacement direction and the displacement speed of the object, the object position in the subsequent imaging cycle or the image processing cycle. Thereby, for example, even when the displacement speed of the object is large, the object is certainly included within the priority image. Therefore, setting the boundary near the object position, and the deterioration of the overhead-view image are avoided.

According to the above embodiment, the object is continuously included within the priority image. Hence, since setting the boundary near the object is avoided, discontinuity of the image around the boundary is suppressed, and the deterioration of the visibility of the object is avoided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a detecting unit which detects a position of an object included within an overlapping region of a first image corresponding to a traveling direction of a vehicle or an opposite direction to the traveling direction and a second image corresponding to a direction crossing the traveling direction of the vehicle;
a processing unit which assigns the first image a first evaluation value when the object is in a first position, and a second evaluation value, which is smaller than the first evaluation value, when the object is in a second position, of which a distance from a traveling direction axis of the vehicle is larger than the same of the first position, and assigns the second image a third evaluation value when the object is in the first position, and a fourth evaluation value, which is larger than the third evaluation value, when the object is in the second position;
a determining unit which determines a boundary of the first and second images for joining the first and second images, so that the object is included within either of the first and second images, which has a larger evaluation value than the other; and
a generating unit which joins the first and second images along the boundary and generates an image, in which a region around the vehicle is viewed from a prescribed view point.

2. The image processing apparatus according to claim 1, wherein
the processing unit assigns the first and second images evaluation values, so that the evaluation values assigned to the first and second images when the object displaces in the opposite direction to the traveling direction of the vehicle are respectively larger than the evaluation values assigned to the first and second images when the object at the same position displaces in the traveling direction.

3. The image processing apparatus according to claim 1, wherein
the processing unit assigns the first and second images evaluation values, so that the evaluation values assigned to the first and second images when the object displaces approaching to the traveling direction axis are respectively larger than the evaluation values assigned to the first and second images when the object at the same position displaces departing from the traveling direction axis.

4. The image processing apparatus according to claim 1, wherein
the processing unit assigns the first and second images evaluation values, so that, in a case that the vehicle makes a turn to a turn direction, the evaluation values assigned to the first and second images when the object displaces in the turn direction are respectively larger than the evaluation values assigned to the first and second images when the object at the same position displaces in the turn direction.

5. The image processing apparatus according to claim 1, wherein
the processing unit assigns the first and second images evaluation values, so that, in a case that the vehicle makes a turn to a turn direction, the evaluation values assigned to the first and second images when the object displaces by a first displacement amount per unit time at the first and second positions are respectively larger than the evaluation values assigned to the first and second images when the object displaces by a second displacement amount per unit time, which is smaller than the first displacement amount per unit time, at the first and second positions.

6. The image processing apparatus according to claim 1, wherein
the processing unit assigns the first and second images evaluation values, so that the evaluation values assigned to the first and second images when a size of the object is a first size are respectively larger than the evaluation values assigned to the first and second images when the size of the object is a second size which is smaller than the first size.

7. The image processing apparatus according to claim 1, wherein
the determining unit changes the previously determined boundary to a new determined boundary when a time-dependent change amount of a difference between the evaluation values assigned to the first and second images is equal to or greater than a reference amount, or maintains the previously determined boundary when the change amount is less than the reference amount.

8. The image processing apparatus according to claim 1, wherein
the determining unit changes the previously determined boundary to a newly determined boundary when the evaluation values assigned to the first and second images are equal to or larger than a reference value, or maintains the previously determined boundary when the evaluation values assigned to the first and second images are less than the reference value.

9. An image processing system comprising:
a detecting unit which detects a position of an object included within an overlapping region of a first image corresponding to a traveling direction of a vehicle or an opposite direction to the traveling direction and a second image corresponding to a direction crossing the traveling direction of the vehicle;
a processing unit which assigns the first image a first evaluation value when the object is in a first position, and a second evaluation value, which is smaller than the first evaluation value, when the object is in a second position of which a distance from a traveling direction axis of the vehicle is larger than the same of the first position, and assigns the second image a third evaluation value when the object is in the first position, and a fourth evaluation value, which is larger than the third evaluation value, when the object is in the second position;
a determining unit which determines a boundary of the first and second images for joining the first and second images, so that the object is included within either of the first and second images, which has a larger evaluation value than the other;
a generating unit which joins the first and second images along the boundary and generates an image, in which a region around the vehicle is viewed from a prescribed view point; and
a displaying apparatus which displays the image, in which the region around the vehicle is viewed from the prescribed view point.

10. The image processing system according to claim 9, wherein
the processing unit assigns the first and second images evaluation values, so that the evaluation values assigned to the first and second images when the object displaces in the opposite direction to the traveling direction of the vehicle are respectively larger than the evaluation values assigned to the first and second images when the object at the same position displaces in the traveling direction.

11. The image processing system according to claim 9, wherein
the processing unit assigns the first and second images evaluation values, so that the evaluation values assigned to the first and second images when the object displaces approaching to the traveling direction axis are respectively larger than the evaluation values assigned to the first and second images when the object at the same position displaces departing from the traveling direction axis.

12. The image processing system according to claim 9, wherein the processing unit assigns the first and second images evaluation values, so that, in a case that the vehicle makes a turn to a turn direction, the evaluation values assigned to the first and second images when the object displaces in the turn direction are respectively larger than the evaluation values assigned to the first and second images when the object at the same position displaces in the turn direction.

13. The image processing system according to claim 9, wherein the processing unit assigns the first and second images evaluation values, so that, in a case that the vehicle makes a turn to a turn direction, the evaluation values assigned to the first and second images when the object displaces by a first displacement amount per unit time at the first and second positions are respectively larger than the evaluation values assigned to the first and second images when the object displaces by a second displacement amount per unit time, which is smaller than the first displacement amount per unit time, at the first and second positions.

14. The image processing system according to claim 9, wherein
the processing unit assigns the first and second images evaluation values, so that the evaluation values assigned to the first and second images when a size of the object is a first size are respectively larger than the evaluation values assigned to the first and second images when the size of the object is a second size which is smaller than the first size.

15. An image processing method comprising:
detecting a position of an object included within an overlapping region of a first image corresponding to a traveling direction of a vehicle or an opposite direction to the traveling direction and a second image corresponding to a direction crossing the traveling direction of the vehicle;
assigning the first image a first evaluation value when the object is in a first position, and a second evaluation value, which is smaller than the first evaluation value, when the object is in a second position of which a distance from a traveling direction axis of the vehicle is larger than the same of the first position;
assigning the second image a third evaluation value when the object is in the first position, and a fourth evaluation value, which is larger than the third evaluation value, when the object is in the second position;
determining a boundary of the first and second images for joining the first and second images, so that the object is included within either of the first and second images, which has a larger evaluation value than the other; and
joining the first and second images along the boundary to generate an image, in which a region around the vehicle is viewed from a prescribed view point.

16. The image processing method according to claim 15, wherein
the evaluation values are assigned to the first and second images, so that the evaluation values assigned to the first and second images when the object displaces in the opposite direction to the traveling direction of the vehicle are respectively larger than evaluation values assigned to the first and second images when the object at the same position displaces in the traveling direction.

17. The image processing method according to claim 15, wherein
the evaluation values are assigned to the first and second images, so that the evaluation values assigned to the first and second images when the object displaces approaching to the traveling direction axis are respectively larger than the evaluation values assigned to the first and second images when the object at the same position displaces departing from the traveling direction axis.

18. The image processing method according to claim 15, wherein
the evaluation values are assigned to the first and second images, so that, in a case that the vehicle makes a turn to a turn direction, the evaluation values assigned to the first and second images when the object displaces in the turn direction are respectively larger than the evaluation values assigned to the first and second images when the object at the same position displaces in the turn direction.

19. The image processing method according to claim 15, wherein
the evaluation values are assigned to the first and second images, so that, in a case that the vehicle makes a turn to a turn direction, the evaluation values assigned to the first and second images when the object displaces by a first displacement amount per unit time at the first and second positions are respectively larger than the evaluation values assigned to the first and second images when the object displaces by a second displacement amount per unit time, which is smaller than the first displacement amount per unit time, at the first and second positions.

* * * * *